(12) United States Patent
Teerlink

(10) Patent No.: US 9,298,722 B2
(45) Date of Patent: Mar. 29, 2016

(54) OPTIMAL SEQUENTIAL (DE)COMPRESSION OF DIGITAL DATA

(75) Inventor: Craig N. Teerlink, Cedar Hills, UT (US)

(73) Assignee: NOVELL, INC., Provo, UT (US)

( * ) Notice: Subject to any disclaimer, the term of this patent is extended or adjusted under 35 U.S.C. 154(b) by 879 days.

(21) Appl. No.: 12/568,190

(22) Filed: Sep. 28, 2009

(65) Prior Publication Data

US 2011/0016096 A1 Jan. 20, 2011

Related U.S. Application Data

(60) Provisional application No. 61/236,571, filed on Aug. 25, 2009, provisional application No. 61/271,079, filed on Jul. 16, 2009.

(51) Int. Cl.
| | |
|---|---|
| *G06F 17/30* | (2006.01) |
| *H04L 9/08* | (2006.01) |
| *G06T 9/00* | (2006.01) |
| *H04N 19/00* | (2014.01) |

(52) U.S. Cl.
CPC .... *G06F 17/30153* (2013.01); *G06F 17/30598* (2013.01); *G06T 9/005* (2013.01); *H04L 9/0894* (2013.01); *H04N 19/00* (2013.01); *H04L 2209/30* (2013.01); *H04L 2209/34* (2013.01); *Y10S 707/972* (2013.01)

(58) Field of Classification Search
USPC .................................................. 707/741, 693
See application file for complete search history.

(56) References Cited

U.S. PATENT DOCUMENTS

| | | | |
|---|---|---|---|
| 5,376,968 A * | 12/1994 | Wu et al. ................... | 375/240.14 |
| 5,561,421 A | 10/1996 | Smith et al. | |
| 5,590,317 A | 12/1996 | Iguchi et al. | |
| 5,612,693 A * | 3/1997 | Craft et al. ................... | 341/51 |
| 5,710,719 A | 1/1998 | Houle | |
| 5,838,963 A * | 11/1998 | Griffiths | |
| 6,108,619 A | 8/2000 | Carter et al. | |
| 6,121,903 A | 9/2000 | Kalkstein | |
| 6,154,213 A | 11/2000 | Rennison et al. | |
| 6,263,422 B1 | 7/2001 | Wise et al. | |

(Continued)

OTHER PUBLICATIONS

Jesper Larsson and Alistair Moffat, "Off-line Disctionary-Based Compression" 1999, IEEE, Data Compression Conference, , vol. 88, Edition No. 11, pp. 1722-1732.*

(Continued)

*Primary Examiner* — Son T Hoang
(74) *Attorney, Agent, or Firm* — King & Schickli, PLLC

(57) ABSTRACT

Methods and apparatus involve an original data stream arranged as a plurality of symbols. Of those symbols, all possible tuples are identified and the highest or most frequently occurring tuple is determined. A new symbol is created and substituted for each instance of the highest occurring tuple, which results in a new data stream. The new data stream is encoded and its size determined. Also, a size of a dictionary carrying all the original and new symbols is determined. The encoding size, the size of the dictionary and sizes of any other attendant overhead is compared to a size of the original data to see if compression has occurred, and by how much. Upon reaching pre-defined objectives, compression ceases. Decompression occurs oppositely. Other features include resolving ties between equally occurring tuples, path weighted Huffman coding, storing files, decoding structures, and computing arrangements and program products, to name a few.

19 Claims, 84 Drawing Sheets

(56) References Cited

U.S. PATENT DOCUMENTS

| | | | |
|---|---|---|---|
| 6,298,174 | B1 | 10/2001 | Lantrip et al. |
| 6,424,971 | B1 | 7/2002 | Kreulen et al. |
| 6,546,146 | B1 | 4/2003 | Hollinger et al. |
| 6,667,700 | B1 | 12/2003 | McCanne et al. |
| 6,701,318 | B2 | 3/2004 | Fox et al. |
| 6,906,645 | B2 | 6/2005 | Jones et al. |
| 6,919,826 | B1 | 7/2005 | Peacock |
| 7,026,960 | B2 | 4/2006 | Lee et al. |
| 7,026,962 | B1 | 4/2006 | Emami et al. |
| 7,031,910 | B2 | 4/2006 | Eisele |
| 7,152,031 | B1 | 12/2006 | Jensen et al. |
| 7,197,451 | B1 | 3/2007 | Carter et al. |
| 7,280,920 | B1 | 10/2007 | Whiteside et al. |
| 7,286,977 | B1 | 10/2007 | Carter et al. |
| 7,289,985 | B2 | 10/2007 | Zeng et al. |
| 7,305,389 | B2 | 12/2007 | Zeng et al. |
| 7,386,560 | B2 | 6/2008 | Tan |
| 7,389,225 | B1 | 6/2008 | Jensen et al. |
| 7,417,568 | B2 | 8/2008 | Fallon et al. |
| 7,475,008 | B2 | 1/2009 | Jensen et al. |
| 7,499,923 | B2 | 3/2009 | Kawatani |
| 7,502,785 | B2 | 3/2009 | Chen et al. |
| 7,529,735 | B2 | 5/2009 | Zhang et al. |
| 7,562,011 | B2 | 7/2009 | Carter et al. |
| 7,624,130 | B2 | 11/2009 | Chen et al. |
| 7,634,471 | B2 | 12/2009 | Chen et al. |
| 7,650,320 | B2 | 1/2010 | Nakano |
| 7,653,202 | B2 | 1/2010 | Randell |
| 7,653,530 | B2 | 1/2010 | Carter et al. |
| RE41,152 | E | 2/2010 | Reynar et al. |
| 7,737,870 | B1 | 6/2010 | Wang |
| 7,809,704 | B2 | 10/2010 | Surendran et al. |
| 2002/0042793 | A1 | 4/2002 | Choi |
| 2002/0113818 | A1 | 8/2002 | Tsuda |
| 2002/0169770 | A1 | 11/2002 | Kim et al. |
| 2002/0191224 | A1 | 12/2002 | Yagishita et al. |
| 2003/0004938 | A1 | 1/2003 | Lawder |
| 2003/0006918 | A1 | 1/2003 | Barnett |
| 2003/0078899 | A1 | 4/2003 | Shanahan |
| 2003/0145014 | A1 | 7/2003 | Minch |
| 2003/0149727 | A1 | 8/2003 | Jaschek et al. |
| 2003/0206125 | A1 | 11/2003 | Abdat |
| 2003/0212695 | A1 | 11/2003 | Rissanen |
| 2003/0220922 | A1 | 11/2003 | Yamamoto et al. |
| 2004/0003264 | A1 | 1/2004 | Zeman et al. |
| 2004/0022312 | A1* | 2/2004 | Jones et al. .................. 375/240 |
| 2004/0156613 | A1 | 8/2004 | Hempel et al. |
| 2004/0162996 | A1 | 8/2004 | Wallace et al. |
| 2004/0230577 | A1 | 11/2004 | Kawatani |
| 2005/0008227 | A1 | 1/2005 | Duan et al. |
| 2005/0075862 | A1 | 4/2005 | Paulin |
| 2005/0114290 | A1 | 5/2005 | Borthakur et al. |
| 2005/0268325 | A1 | 12/2005 | Kuno et al. |
| 2006/0114990 | A1 | 6/2006 | Pak |
| 2006/0155662 | A1 | 7/2006 | Murakami et al. |
| 2006/0190465 | A1 | 8/2006 | Nakano |
| 2006/0285760 | A1 | 12/2006 | Malvar |
| 2006/0288029 | A1 | 12/2006 | Murakami et al. |
| 2007/0008191 | A1 | 1/2007 | Archbold et al. |
| 2007/0043718 | A1 | 2/2007 | Arellanes et al. |
| 2007/0057825 | A1 | 3/2007 | De Martin et al. |
| 2007/0083368 | A1 | 4/2007 | Handley |
| 2007/0168320 | A1 | 7/2007 | Borthakur et al. |
| 2008/0016246 | A1* | 1/2008 | Singh .......................... 709/247 |
| 2008/0040690 | A1 | 2/2008 | Sakai |
| 2008/0050025 | A1 | 2/2008 | Bashyam et al. |
| 2008/0050026 | A1 | 2/2008 | Bashyam et al. |
| 2008/0050027 | A1 | 2/2008 | Bashyam et al. |
| 2008/0050029 | A1 | 2/2008 | Bashyam et al. |
| 2008/0050047 | A1 | 2/2008 | Bashyam et al. |
| 2008/0066146 | A1 | 3/2008 | Dillaway |
| 2008/0076355 | A1 | 3/2008 | Waltermann et al. |
| 2008/0091698 | A1 | 4/2008 | Cook et al. |
| 2008/0122664 | A1 | 5/2008 | Chang et al. |
| 2008/0126858 | A1 | 5/2008 | Barras |
| 2008/0147646 | A1 | 6/2008 | Jaschek et al. |
| 2008/0152235 | A1 | 6/2008 | Bashyam et al. |
| 2008/0154928 | A1 | 6/2008 | Bashyam et al. |
| 2008/0180284 | A1 | 7/2008 | Luby |
| 2008/0222170 | A1 | 9/2008 | Farnham et al. |
| 2008/0228795 | A1 | 9/2008 | Lomet |
| 2008/0240583 | A1* | 10/2008 | Jones .......................... 382/232 |
| 2008/0243518 | A1 | 10/2008 | Oraevsky et al. |
| 2009/0018801 | A1 | 1/2009 | Gladkova et al. |
| 2009/0018996 | A1 | 1/2009 | Hunt et al. |
| 2009/0046864 | A1 | 2/2009 | Mahabub et al. |
| 2009/0060047 | A1 | 3/2009 | Schneider |
| 2009/0115646 | A1 | 5/2009 | Duxbury |
| 2009/0144561 | A1 | 6/2009 | Davidson et al. |
| 2009/0316200 | A1 | 12/2009 | Kubota et al. |
| 2009/0319467 | A1 | 12/2009 | Berg et al. |
| 2010/0057798 | A1 | 3/2010 | Zhang et al. |
| 2010/0138216 | A1 | 6/2010 | Tanev |
| 2010/0169285 | A1 | 7/2010 | Bansal et al. |
| 2010/0259631 | A1* | 10/2010 | Sugita ........................ 348/222.1 |
| 2011/0016098 | A1 | 1/2011 | Teerlink |
| 2011/0016101 | A1 | 1/2011 | Isaacson et al. |
| 2011/0016124 | A1 | 1/2011 | Isaacson et al. |
| 2011/0016135 | A1 | 1/2011 | Teerlink |
| 2011/0016136 | A1 | 1/2011 | Isaacson et al. |
| 2011/0016138 | A1 | 1/2011 | Teerlink |
| 2011/0047156 | A1 | 2/2011 | Knight et al. |
| 2011/0252063 | A1 | 10/2011 | Isaacson et al. |

OTHER PUBLICATIONS http://figment.csee.usf.edu/~sfefilat/data/papers/TuAT1.4.pdf "Beyond Partitions: Allowing Overlapping Groups in Pairwise Clustering", Andrea Torsello, Samuel Rota Bul'o, and Marcello Pelillo Copyright 2008 4 Pages.

Gergely Palla, Imre Derényl, Illés Farkes & Tamás Vicsek Undated 12 Pages.

http://sequitur.info/jair/ "Identifying Hierarchical Structure in Sequences: A Linear-Time Algorithm", Craig G. Nevill-Manning and Ian H. Witten Printed Oct. 27, 2008 16 Pages.

http://arxiv.org/ftp/arxiv/papers/0801/0801.4024.pdf "Set-based Complexity and Biological Information".

David J. Galas, Matti Nykter, Gregory W. Carter,Nathan D. Price and Ilya Shmulevich Jan. 11, 2008 30 Pages.

Neva Cherniavsky, et al.; "Grammar-based Compression of DNA Sequences," UW CSE Technical Report May 2, 2007; May 28, 2004; pp. 1-21.

Gergely Pella, et al.; "Uncovering the overlapping community structure of complex networks in nature and society"; Nature 435 (Jun. 9, 2005); Nature Publishing Group 2012; pp. 1-12.

George B. Davis, et al.; Clearing the FOG : Fuzzy, Overlapping Groups for Social Networks; Carnegie Mellon University, Pittsburgh, PA; Social Networks, vol. 30, No. 3 (Jul. 2008); pp. 1-45.

Pluempitiwriyawej, et al.; "Element matching across data-oriented XML sources using a multi-strategy clustering model"; Data & Knowledge Engineering 28 (2004) pp. 297-333.

Stephen O'Hara et al.; "Agent-based reduction of information density (ARID) demonstration International Conference of Autonomous Agents"; Proceedings of the 6th international joint conference of Autonomous Agents and multiagent systems; Published 2007; Abstract printed from Portal.com Feb. 1, 2010; 2 pages.

Hrishikesh Aradhye, et al.; "Recognizing patterns in information retrieval: a memory-based classifier for inferring relevancy"; Artificial Intelligence in Engineering; vol. 12, Issues 1-2, Jan.-Apr. 1998, pp. 99-105.

G. Apostolopoulos,et al; "Design, implementation and performance of a content-based switch"; Siara Syst., Mountain View, CA; www.ieeexplore.ieee.org; printed Feb. 9, 2010; 1 page.

European Search Report for European Application No. 11157556,9 dated Jan. 24, 2012.

Maria Riaz, et al.; "Incorporating Semantics-Based Search and Policy-Based Access Control Mechanism in Context Service Delivery"; Fourth Annual ACIS International Conference on Computer and Information Science (ICIS'05), 2005; pp. 175-180.

(56) References Cited

OTHER PUBLICATIONS

David K. Gifford, et al.; "Semantic File Systems"; 13th ACM Symposium on Operating Systems Principles, Oct. 1991.
Timothy Khouri; "Making Your Own Semantic Controls"; http://www.singingeels.com/Articles/Making_Your_Own_Semantic_Controls.aspx; Apr. 27, 2007.
Yague, M.I., Mana, et al.; "Semantic Access Control"; Second Authentication and Authorisation; Nov. 20-21, 2003; Magala, Spain; http://www.terena.org/activities/tf-aace/AAworkshop/ppt/SemanticAccessControl.pdf.
Patrick J. Lynch and Sarah Horton; "Semantic Content Markup" Web Style Guide 3rd Edition; Copyright 2008-2009 Lynch and Horton; http://webstyleguide.com/wsg3/5-site-structure/2-semantic-markup.html.
"Understanding and Selecting a DLP Solution: Part 2, Content Awareness"; Posted at Thursday Sep. 13, 2007 7:29 am; http://securosis.com/blog/understanding-and-selecting-a-dlp-solution-part-2-content-awareness.
Yahoo turns to semantic web for improving search; Saturday, Mar. 15, 2008 3:53:42 AM by admin 2 Pages; http://www.thaindian.com/newsportal/south-asia/yahoo-turns-to-semantic-web-for-improving-search_10027695.html.
Li Ding, et al; "How the Semantic Web is Being Used:An Analysis of FOAF Documents" Proceedings of the 38th International Conference on System Sciences, pp. 1-10, 2005.
Lei Li, et al.; "A software Framework for Matchmaking based on semantic web technology"; WWW '03 Proceedings of the 12th international conference on World Wide Web:pp. 331-339; ACM, © 2003.
Final Office Action for U.S. Appl. No. 12/684,313 dated Mar. 5, 2012.
Office Action for U.S. Appl. No. 12/684,313 dated Oct. 19, 2011.
Office Action for U.S. Appl. No. 12/649,584 dated Nov. 14, 2011.
Final Office Action for U.S. Appl. No. 12/649,688 dated Feb. 29, 2012.
Office Action for U.S. Appl. No. 12/649,688 dated Nov. 14, 2011.
Office Action for U.S. Appl. No. 12/637,807 dated Sep. 26, 2011.
Final Office Action for U.S. Appl. No. 12/575,767 dated Feb. 15, 2012.
Office Action for U.S. Appl. No. 12/575,767 dated Sep. 13, 2011.
Office Action for U.S. Appl. No. 12/616,306 dated Oct. 3, 2011.
Office Action for U.S. Appl. No. 12/759,414 dated Dec. 30, 2011.
Office Action for U.S. Appl. No. 12/759,414 dated Jul. 11, 2011.
Office Action for U.S. Appl. No. 12/720,897 dated Nov. 30, 2011.
Final Office Action for U.S. Appl. No. 12/616,306 dated Mar. 22, 2012.
Office Action for U.S. Appl. No. 12/648,542 dated Mar. 28, 2012.
Cilibrasi et al.; "Clustering by Compression"; Apr. 2005; Information Theory; IEEE, vol. 51, No. 4, pp. 1523-1545.
Manner; "A Text Compression Scheme that Allows Fast Searching Directly in the Compressed File"; Apr. 1997; ACM Transactions on Information Systems, vol. 15, No. 2, pp. 124-136.
Nakamura et al,"Data Compression by Concatenations of Symbol Pairs"; In Proceedings of the IEEE Symposium Theory and Its Applications; 1996; (Victoria, BC), pp. 498-499.
Office Action for U.S. Appl. No. 12/575,652 dated Jun. 28, 2012.
Final Office Action for U.S. Appl. No. 12/649,584 dated Jun. 14, 2012.
Office Action for U.S. Appl. No. 12/575,767 dated Jun. 11, 2012.
Office Action for U.S. Appl. No. 12/616,306 dated Jul. 12, 2012.
Final Office Action for U.S. Appl. No. 12/637,807 dated Jul. 24, 2012.
Final Office Action for U.S. Appl. No. 12/648,542 dated Oct. 5, 2012.
Manoranjan Dash, et al.; "Distance Based Feature Selection for Clustering Microarray Data"; Database Systems for Advanced Applications; Springer-Verlag Berlin Heidelberg 2008; DASFAA, LNCS 4947, pp. 512-519.
Final Office Action for U.S. Appl. No. 12/575,767 dated Nov. 23, 2012.
European Search Report for EP Application No. EP11161790 dated Jul. 2, 2012.
Office Action for U.S. Appl. No. 12/649,688 dated Dec. 26, 2012.
Office Action for U.S. Appl. No. 12/649,584 dated Apr. 11, 2013.
Final Office Action for U.S. Appl. No. 12/616,306 dated Jan. 23, 2013.
Final Office Action for U.S. Appl. No. 12/575,652 dated Feb. 14, 2013.
Final Office Action for U.S. Appl. No. 12/759,414 dated May 1, 2013.
Beyond Compare; http://www.scootersoftware.com/BC2Help.pdf; Jun. 6, 2005.
Compare Archives; http://www.aotsinc.com/products/compare-archive/CompareArchives.pdf; Nov. 18, 2008.
Final Office Action for U.S. Appl. No. 12/649,688 dated Jul. 19, 2013.
Office Action for U.S. Appl. No. 12/575,652 dated Jul. 5, 2013.
Office Action for U.S. Appl. No. 12/616,306 dated May 24, 2013.
Office Action for U.S. Appl. No. 12/637,807 dated Sep. 10, 2013.
Office Action for U.S. Appl. No. 13/006,755 dated Sep. 10, 2013.

* cited by examiner

| Term | Definition |
|---|---|
| Alphabet | The set of all possible symbols currently in use. |
| Atomic symbols | The symbols 0 and 1, which are based on the raw 0 and 1 bit values. All subsequently defined symbols represent tuples that are based on symbols 0 and 1. |
| Character | A symbol that appears in the data stream. |
| Compressed file size | The number of bits that are required to store the encoded data stream, the dictionary, and the symbol-encoding information. |
| Data stream | A sequential stream of characters.<br>The terms data stream and text are synonymous in this document. |
| Dictionary | A collection of information regarding all symbols (the alphabet). |
| Encoded data stream | A data stream of Huffman encoded characters. |
| Pass | The performance of one iteration of the compression procedure applied to the current data stream. |
| Symbol | A unit of information. The information that is represented by a symbol can be from 1 to N binary bits in length. |
| Symbol-encoding information | Symbols in the alphabet are digitally encoded to reduce the amount of space required to store or transmit them electronically. The encoding information is stored and used to decompress the data later.<br>A well understood method of minimizing the space required to store a series of characters is the use of minimum weighted path length trees, as given by David Huffman (D. E. Knuth, *The Art of Computer Programming*, 1973, vol. 1, p. 402). |
| Text | A sequential stream of characters.<br>The terms data stream and text are synonymous in this document. |
| Tuple | Two adjoining characters in the data stream or text. The order of the appearance of characters in the tuple is designated as "first" and "last". The notation for tuples is "first>last" to show the order of appearance in the pair of characters and to avoid confusion of the tuples with real numbers. For example, a tuple of symbol 1 followed by symbol 0 is written as 1>0.<br>In each pass through the data stream, the most highly occurring tuple is determined. A new symbol is created to represent the tuple in the data stream. The symbol stands for and replaces all occurrences of the tuple in the data stream. |

FIG. 1

| Tuple Count | First | |
|---|---|---|
| Last | 0 | 1 |
| 0 | 2 | 2 |
| 1 | 3 | 1 |

| Tuple | $A^2$ | $B^2$ | $C^2$ | Hypotenuse |
|---|---|---|---|---|
| 1>5 | 1 | 25 | 26 | 5.1 |
| 3>7 | 9 | 49 | 58 | 7.6 |
| 4>4 | 16 | 16 | 32 | 5.7 |

FIG. 6

| Tuple Array | First | | | | | | | |
|---|---|---|---|---|---|---|---|---|
| Last | | 1 | 2 | 3 | 4 | 5 | 6 | 7 |
| 0 | 0>0 | 1>0 | 2>0 | 3>0 | 4>0 | 5>0 | 6>0 | 7>0 |
| 1 | 0>1 | 1>1 | 2>1 | 3>1 | 4>1 | 5>1 | 6>1 | 7>1 |
| 2 | 0>2 | 1>2 | 2>2 | 3>2 | 4>2 | 5>2 | 6>2 | 7>2 |
| 3 | 0>3 | 1>3 | 2>3 | 3>3 | 4>3 | 5>3 | 6>3 | 7>3 |
| 4 | 0>4 | 1>4 | 2>4 | 3>4 | 4>4 | 5>4 | 6>4 | 7>4 |
| 5 | 0>5 | 1>5 | 2>5 | 3>5 | 4>5 | 5>5 | 6>5 | 7>5 |
| 6 | 0>6 | 1>6 | 2>6 | 3>6 | 4>6 | 5>6 | 6>6 | 7>6 |
| 7 | 0>7 | 1>7 | 2>7 | 3>7 | 4>7 | 5>7 | 6>7 | 7>7 |

FIG. 7

| Tuple Array | First | |
|---|---|---|
| Last | 0 | 1 |
| 0 | 0>0 | 1>0 |
| 1 | 0>1 | 1>1 |

| Tuple Count | First | |
|---|---|---|
| Last | 0 | 1 |
| 0 | 95 | 96 |
| 1 | 96 | 48 |

FIG. 11

| Symbol | Count |
|---|---|
| 0 | 240 |
| 1 | 144 |
| Total | 384 |

| Symbol | Huffman Code | Bit Length | Symbol Count | Total Bits |
|---|---|---|---|---|
| 0 | 0 | 1 | 144 | 144 |
| 1 | 101 | 3 | 48 | 144 |
| 2 | 11 | 2 | 96 | 192 |
| EOF | 100 | 3 | 1 | 3 |
| | | | Total Bits for Data | 483 |

FIG. 17

| Compressed File Size | Original Bit Count | Current Bit Count |
|---|---|---|
| Data Length | 384 | 483 |
| Overhead | 0 | 25 |
| Total Bits Needed | 384 | 508 |
| Compression Ratio | | 132% |

| Tuple Array | First | | |
|---|---|---|---|
| Last | 0 | 1 | 2 |
| 0 | 0>0 | 1>0 | 2>0 |
| 1 | 0>1 | 1>1 | 2>1 |
| 2 | 0>2 | 1>2 | 2>2 |

| Tuple Count | First | | |
|---|---|---|---|
| Last | 0 | 1 | 2 |
| 0 | 48 | 0 | (56) |
| 1 | 9 | 0 | 39 |
| 2 | 48 | 48 | 0 |

| Alphabet | Definition | |
|---|---|---|
| | First | Last |
| 0 | 0 | - |
| 1 | 1 | - |
| 2 | 1 | 0 |
| 3 | 2 | 0 |

FIG. 22

| Compressed File Size | Original | Current |
|---|---:|---:|
| Data Length | 384 | 507 |
| Overhead | 0 | 38 |
| Total Bits Needed | 384 | 545 |
| Compression Ratio | | 141% |

FIG. 27

| Tuple Array | First | | | |
|---|---|---|---|---|
| Last | 0 | 1 | 2 | 3 |
| 0 | 0>0 | 1>0 | 2>0 | 3>0 |
| 1 | 0>1 | 1>1 | 2>1 | 3>1 |
| 2 | 0>2 | 1>2 | 2>2 | 3>2 |
| 3 | 0>3 | 1>3 | 2>3 | 3>3 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |

| Symbol | Symbol Count | Huffman Code |
|---|---|---|
| 0 | 88 | 0 |
| 1 | 0 | - |
| 2 | 40 | 111 |
| 3 | 8 | 1101 |
| 4 | 48 | 10 |
| EOF | 1 | 1100 |

| Compressed File Size | Original | Current |
|---|---|---|
| Data Length | 384 | 340 |
| Overhead | 0 | 42 |
| Total Bits Needed | 384 | 382 |
| Compression Ratio | | 99% |

FIG. 35

| Tuple Array | First | | | | |
|---|---|---|---|---|---|
| Last | 0 | 1 | 2 | 3 | 4 |
| 0 | 0>0 | 1>0 | 2>0 | 3>0 | 4>0 |
| 1 | 0>1 | 1>1 | 2>1 | 3>1 | 4>1 |
| 2 | 0>2 | 1>2 | 2>2 | 3>2 | 4>2 |
| 3 | 0>3 | 1>3 | 2>3 | 3>3 | 4>3 |
| 4 | 0>4 | 1>4 | 2>4 | 3>4 | 4>4 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |

| Symbol | Symbol Count | Huffman Code |
|---|---|---|
| 0 | 40 | 10 |
| 1 | 0 | - |
| 2 | 40 | 01 |
| 3 | 8 | 001 |
| 4 | 0 | - |
| 5 | 48 | 11 |
| EOF | 1 | 000 |

| Symbol | Huffman Code | Bit Length | Symbol Count | Total Bits |
|---|---|---|---|---|
| 0 | 10 | 2 | 40 | 80 |
| 2 | 01 | 2 | 40 | 80 |
| 3 | 001 | 3 | 8 | 24 |
| 5 | 11 | 2 | 48 | 96 |
| EOF | 000 | 3 | 1 | 3 |
| | | | Total Bits for Data | 283 |

| Compression Overhead | Current |
|---|---|
| File Information | 8 |
| Dictionary Length | 16 |
| Tree Length | 24 |
| Total Overhead | 48 |

FIG. 42

| Compressed File Size | Original | Current |
|---|---|---|
| Data Length | 384 | 283 |
| Overhead | 0 | 48 |
| Total Bits Needed | 384 | 331 |
| Compression Ratio | | 86% |

| Tuple Array | First | | | | | |
| --- | --- | --- | --- | --- | --- | --- |
| Last | 0 | 1 | 2 | 3 | 4 | 5 |
| 0 | 0>0 | 1>0 | 2>0 | 3>0 | 4>0 | 5>0 |
| 1 | 0>1 | 1>1 | 2>1 | 3>1 | 4>1 | 5>1 |
| 2 | 0>2 | 1>2 | 2>2 | 3>2 | 4>2 | 5>2 |
| 3 | 0>3 | 1>3 | 2>3 | 3>3 | 4>3 | 5>3 |
| 4 | 0>4 | 1>4 | 2>4 | 3>4 | 4>4 | 5>4 |
| 5 | 0>5 | 1>5 | 2>5 | 3>5 | 4>5 | 5>5 |

FIG. 44

| Tuple Count | First | | | | | |
|---|---|---|---|---|---|---|
| Last | 0 | 1 | 2 | 3 | 4 | 5 |
| 0 | 0 | 0 | 0 | 0 | 0 | 39 |
| 1 | 0 | 0 | 0 | 0 | 0 | 0 |
| 2 | 39 | 0 | 0 | 0 | 0 | 1 |
| 3 | 0 | 0 | 0 | 0 | 0 | 8 |
| 4 | 0 | 0 | 0 | 0 | 0 | 0 |
| 5 | 1 | 0 | 39 | 8 | 0 | 0 |

FIG. 45

| Alphabet | Definition 26-5 | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |
| 6 | 2 | 5 |

| Compression Overhead | Current |
|---|---|
| File Information | 8 |
| Dictionary Length | 22 |
| Tree Length | 29 |
| Total Overhead | 59 |

| Compressed File Size | Original | Current |
|---|---|---|
| Data Length | 384 | 187 |
| Overhead | 0 | 59 |
| Total Bits Needed | 384 | 246 |
| Compression Ratio | | 64% |

| Tuple Array | First | | | | | | |
|---|---|---|---|---|---|---|---|
| Last | 0 | 1 | 2 | 3 | 4 | 5 | 6 |
| 0 | 0>0 | 1>0 | 2>0 | 3>0 | 4>0 | 5>0 | 6>0 |
| 1 | 0>1 | 1>1 | 2>1 | 3>1 | 4>1 | 5>1 | 6>1 |
| 2 | 0>2 | 1>2 | 2>2 | 3>2 | 4>2 | 5>2 | 6>2 |
| 3 | 0>3 | 1>3 | 2>3 | 3>3 | 4>3 | 5>3 | 6>3 |
| 4 | 0>4 | 1>4 | 2>4 | 3>4 | 4>4 | 5>4 | 6>4 |
| 5 | 0>5 | 1>5 | 2>5 | 3>5 | 4>5 | 5>5 | 6>5 |
| 6 | 0>6 | 1>6 | 2>6 | 3>6 | 4>6 | 5>6 | 6>6 |

| Tuple Count | First | | | | | | |
|---|---|---|---|---|---|---|---|
| Last | 0 | 1 | 2 | 3 | 4 | 5 | 6 |
| 0 | 0 | 0 | 0 | 0 | 0 | 4 | 35 |
| 1 | 0 | 0 | 0 | 0 | 0 | 0 | 0 |
| 2 | 0 | 0 | 0 | 0 | 0 | 1 | 0 |
| 3 | 0 | 0 | 0 | 0 | 0 | 4 | 4 |
| 4 | 0 | 0 | 0 | 0 | 0 | 0 | 0 |
| 5 | 1 | 0 | 0 | 8 | 0 | 0 | 0 |
| 6 | (39) | 0 | 0 | 0 | 0 | 0 | 0 |

| Symbol | Symbol Count | Huffman Code |
|---|---|---|
| 0 | 1 | 0100 |
| 1 | 0 | - |
| 2 | 1 | 01011 |
| 3 | 8 | 011 |
| 4 | 0 | - |
| 5 | 9 | 00 |
| 6 | 0 | - |
| 7 | 39 | 1 |
| EOF | 1 | 01010 |

| Symbol | Huffman Code | Bit Length | Symbol Count | Total Bits |
|---|---|---|---|---|
| 0 | 0100 | 4 | 1 | 4 |
| 2 | 01011 | 5 | 1 | 5 |
| 3 | 011 | 3 | 8 | 24 |
| 5 | 00 | 2 | 9 | 18 |
| 7 | 1 | 1 | 39 | 39 |
| EOF | 01010 | 5 | 1 | 5 |
| | | | Total Bits for Data | 95 |

FIG. 58

| Compression Overhead | Current |
|---|---|
| File Information | 8 |
| Dictionary Length | 28 |
| Tree Length | 35 |
| Total Overhead | 71 |

| Symbol | Occurrences | Huffman Code | Original Bits | Total Original Bits Represented | % of File Represented |
|---|---|---|---|---|---|
| 7 | 39 | 1 | 01011000 | 312 | 81.2 |
| 5 | 9 | 00 | 11000 | 45 | 11.7 |
| 3 | 8 | 011 | 100 | 24 | 6.2 |
| 2 | 1 | 01011 | 10 | 2 | 0.5 |
| 0 | 1 | 0100 | 0 | 1 | 0.3 |
| EOF | 1 | 01010 | N/A | N/A | N/A |

0 5 7 7 7 7 7 7 7 7 7 7 7 7 7 7 7 7 7 7 7 7 7 7 7 7 7 7 7 3 5 7
7 7 3 5 7 7 7 7 7 7 7 7 3 5 7 3 5 3 5 3 5 3 5 3 5 2 EOF

FIG. 66

| Symbol | Huffman Code |
|--------|--------------|
| 0 | 0100 |
| 2 | 01011 |
| 3 | 011 |
| 5 | 00 |
| 7 | 1 |
| EOF | 01010 |

| Symbol | Bits per Symbol |
|---|---|
| 2 | 1 |
| 3 | 2 |
| 4 | 2 |
| 5 | 3 |
| 6 | 3 |
| 7 | 3 |

FIG. 72

|        | Tuple  |        |
|--------|--------|--------|
| Symbol | First  | Last   |
| 0      | atomic | atomic |
| 1      | atomic | atomic |
| 2      | 1      | 0      |
| 3      | 2      | 0      |
| 4      | 1      | 3      |
| 5      | 4      | 0      |
| 6      | 2      | 5      |
| 7      | 0      | 6      |

| Encoded Data | Symbol and Original Bits Represented |
|---|---|
| 0100 | Symbol 0 = 0 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |

| Encoded Data | Symbol and Original Bits Represented |
|---|---|
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 01011 | Symbol 2 = 10 |
| 01010 | EOF=done |

OPTIMAL SEQUENTIAL (DE)COMPRESSION OF DIGITAL DATA

This utility application claims priority to U.S. Provisional Application Ser. Nos. 61/236,571 and 61/271,079, filed Aug. 25, 2009, and Jul. 16, 2009, respectively. Their contents are expressly incorporated herein as if set forth herein.

FIELD OF THE INVENTION

The present invention relates generally to compression/decompression of data. More particularly, the invention relates to finding highly occurring patterns in the data and replacing those patterns with newly defined symbols that require less space to store than the original patterns. Encoding ensues and the process repeats until such time as optimization occurs. Data decompression is another noteworthy feature as are support algorithms and control methods. Dictionaries are also involved as are computing system arrangement and computer program products, to name a few.

BACKGROUND OF THE INVENTION

Recent data suggests that nearly eighty-five percent of all data is found in computing files and growing annually at around sixty percent. One reason for the growth is that regulatory compliance acts, statutes, etc., (e.g., Sarbanes-Oxley, HIPAA, PCI) force companies to keep file data in an accessible state for extended periods of time. However, block level operations in computers are too lowly to apply any meaningful interpretation of this stored data beyond taking snapshots and block de-duplication. While other business intelligence products have been introduced to provide capabilities greater than block-level operations, they have been generally limited to structured database analysis. They are much less meaningful when acting upon data stored in unstructured environments.

Unfortunately, entities the world over have paid enormous sums of money to create and store their data, but cannot find much of it later in instances where it is haphazardly arranged or arranged less than intuitively. Not only would locating this information bring back value, but being able to observe patterns in it might also prove valuable despite its usefulness being presently unknown. However, entities cannot expend so much time and effort in finding this data that it outweighs its usefulness. Notwithstanding this, there are still other scenarios, such as government compliance, litigation, audits, etc., that dictate certain data/information be found and produced, regardless of its cost in time, money and effort. Thus, a clear need is identified in the art to better find, organize and identify digital data, especially data left in unstructured states.

In search engine technology, large amounts of unrelated and unstructured digital data can be quickly gathered. However, most engines do little to organize the data other than give a hierarchical presentation. Also, when the engine finds duplicate versions of data, it offers few to no options on eliminating the replication or migrating/relocating redundancies. Thus, a further need in the art exists to overcome the drawbacks of search engines.

When it comes to large amounts of data, whether structured or not, compression techniques have been devised to preserve storage capacity, reduce bandwidth during transmission, etc. With modern compression algorithms, however, they simply exist to scrunch large blocks of data into smaller blocks according to their advertised compression ratios. As is known, some do it without data loss (lossless) while others do it "lossy." None do it, unfortunately, with a view toward recognizing similarities in the data itself.

From biology, it is known that highly similar species have highly similar DNA strings. In the computing context, consider two word processing files relating to stored baseball statistics. In a first file, words might appear for a baseball batter, such as "batting average," "on base percentage," and "slugging percentage," while a second file might have words for a baseball pitcher, such as "strikeouts," "walks," and "earned runs." Conversely, a third file wholly unrelated to baseball, statistics or sports, may have words such as "environmental protection." "furniture," or whatever comes to mind. It would be exceptionally useful if, during times of compression, or upon later manipulation by an algorithm if "mapping" could recognize the similarity in subject matter in the first two files, although not exact to one another, and provide options to a user. Appreciating that the "words" in the example files are represented in the computing context as binary bits (1's or 0's), which occurs by converting the English alphabet into a series of 1's and 0's through application of ASCII encoding techniques, it would be further useful if the compression algorithm could first recognize the similarity in subject matter of the first two files at the level of raw bit data. The reason for this is that not all files have words and instead might represent pictures (e.g., .jpeg) or spread sheets of numbers.

Appreciating that certain products already exist in the above-identified market space, clarity on the need in the art is as follows. One, present day "keyword matching" is limited to select set of words that have been pulled from a document into an index for matching to the same exact words elsewhere. Two, "Greg" is a modern day technique that searches one or more input files for lines containing an identical match to a specified pattern. Three, "Beyond Compare," and similar algorithms, are line-by-line comparisons of multiple documents that highlight differences between them. Four, block level data de-duplication has no application in compliance contexts, data relocation, or business intelligence.

The need in the art, on the other hand, needs to serve advanced notions of identifying new business intelligence, conducting operations on completely unstructured or haphazard data, and organizing it, providing new useful options to users, providing new user views, providing new encryption products, and identifying highly similar data, to name a few. As a byproduct, solving this need will create new opportunities in minimizing transmission bandwidth and storage capacity, among other things. Naturally, any improvements along such lines should contemplate good engineering practices, such as stability, ease of implementation, unobtrusiveness, etc.

SUMMARY OF THE INVENTION

The foregoing and other problems become solved by applying the principles and teachings associated with optimal sequential (de)compression of digital data. Broadly, methods and apparatus involve procedures to compress digital data streams by finding highly occurring patterns, and replacing the patterns with newly defined symbols that require less space to store than the original patterns. The goal of this process is to eliminate as much redundancy from the digital data as possible. The end result is optimal compression of the original digital data.

In a representative embodiment, an original data stream is arranged as a plurality of symbols. Of those symbols, all possible "tuples" (e.g., table 10, FIG. 1) are identified, and the highest or most frequently occurring tuple is determined. A new symbol is created and substituted for each instance of the highest occurring tuple, which results in a new data stream. The new data stream is encoded and its size is determined. Also, a size of a dictionary carrying all the original and new symbols is determined. The encoding size, the size of the dictionary and sizes of any other attendant overhead is compared to a size of the original data to see if compression has occurred, and by how much. Upon reaching pre-defined objectives, compression ceases, and the originally compressed file is produced. Decompression occurs by reading the compression information, building a decode structure using that information, and expanding the encoded data stream using the decode structure. Other features include resolving ties between equally occurring tuples having the most occurrences, path weighted Huffman coding, storing files, and computing arrangements and program products, to name a few.

The foregoing embodiment begins with a definition for a symbol and tuple (e.g., table 10, FIG. 1). Then, compression of a file or bitstream that is thought to contain sequential patterns of symbols occurs as follows:

Identifying all possible tuples that can occur for the set of characters that are in the current data stream.

Determining which of the possible tuples occurs most frequently in the current data stream.

Creating a new symbol for the most highly occurring tuple, and adding it to the dictionary.

Replacing all occurrences of the most highly occurring tuple with the new symbol.

Encoding the symbols in the data stream by using an encoding scheme, such as a path-weighted Huffman coding scheme.

Calculating the compressed file size.

Determining whether the compression goal has been achieved.

Repeating for as long as necessary to achieve optimal compression.

In more detail, the compression begins by defining an alphabet of symbols that initially contains only two symbols representing the bits 0 and 1.

Determine the total length of the bitstream in bits.

Convert the bitstream to symbols, starting with the initial symbols representing 0 and 1. (No actual conversion happens here, but the bitstream is now thought of as a string of symbols, rather than original data.) do {

Scan the symbol stream

Tally the counts of all individual symbols

Tally the counts of all tuples of symbols

Determine the identity of the most frequently occurring tuple in the symbol stream Define a new symbol that represents the most frequently occurring tuple Replace each occurrence of that tuple with the new symbol Adjust the tally of symbol counts taking into consideration those tuples occurrences that were eliminated in the previous line by replacement using the newly defined symbol.

Calculate a Huffman tree (or other encoding method) using the adjusted symbol tallies.

Calculate the number of bits required to represent the symbol stream using the calculated bits to code each symbol and the number of instances of the symbol.

Encode the symbol stream with Huffman tree (or other).

Calculate the number of bits required to represent the alphabet of symbols.

Calculate the number of bits required to represent the Huffman tree which would encode the compressed symbol stream.

Calculate the number of bits required for the file type and maximum symbol width.

Calculate a compressed file size as the sum of the file type plus maximum symbol width plus the Huffman tree representations plus the alphabet representation plus the Huffman encoded symbols.

} until compressed file size is significantly greater than any previously computed filesize.

Generate an output file that contains:

The file type;

The maximum symbol width;

A description of the Huffman tree that describes each symbol;

A description of the alphabet of symbols found in the file;

The Huffman tree encoded string of symbols.

A note regarding the termination of the algorithm is in order. As each new symbol is added to the alphabet, there are several consequences to the total length of a possible compressed file. 1) The average number of bits required to represent each encoded symbol rises. 2) The size of the Huffman tree used to encode the symbols rises, hence the number of bits used to describe the tree rises. This larger description contributes to a growing overhead as the alphabet grows. 3) It has been observed that in most files, the possible output sizes of the file changes in a stepwise function (i.e. it is not smooth), generally downward, but with upward jumps as the number of symbols in the alphabet passes thru powers of two, i.e. 2, 4, 8, 16 . . . 1024, 2048 . . . etc.). 4) At some point there will be so few of the highest occurring tuples to be replaced, that such replacement will result in a larger total output stream. This is because savings created by the addition of another symbol will not compensate for the growth in size (number of bits needed to represent the average symbol) of all the other symbols in the file. At this point, the file output size will begin to gradually grow. Further replacements will cause further growth in file output size. 5) Because it is difficult to determine if an increase in file output size is a result of phenomenon (3) or (4), iteration must continue until it is obvious that there is a long term upward trend in file output size. The conditions representing the minimum file output size are remembered, and those criteria are used to produce the optimally compressed output file.

To decompress a file that has been compressed and stored in the above format. 1. Read the file type. 2. Read the maximum symbol width. 3. Read the description of the Huffman tree that encodes the symbols in the file. 4. Read the description of the alphabet of symbols that make up the file. 5. Build a decoding structure using the above information. 6. Read the Huffman tree encoded bitstream that represents the file symbols. For each symbol read, expand the symbol into its component symbols until the result is the original string of 0's and 1's.

While Huffman tree encoding has been well understood for decades, skilled artisans should recognize at least one unique concept is the act of using iterative definition of new symbols to automatically look for frequently occurring sequences (tuples) of symbols. In the "QU" example below, shrinking the total number of symbols in a file eventually leads every possible tuple being replaced with a single symbol and the number of occurring symbols in the file would reduce to exactly one. However, with the addition of each new symbol to the alphabet, more bits are required to represent any given symbol in the Huffman tree. Compression continues as frequently occurring tuples are eliminated. However, at some optimal point, the frequency all symbols in the file will approach being equal. If the occurrence of every possible symbol is approximately equal, each symbol carries maximal information. Information theory states that a symbol stream that is maximally compressed is defined by a symbol stream with maximal information, and minimum redundancy. The converse statement would also appear to be true, a symbol stream than contains maximal information and minimal redundancy, exhibits maximum compression. The following provides a technique that yields maximum compression to many bitstreams that exhibit sequential redundancy.

Executable instructions hosted on one or more computing devices for undertaking the foregoing are also contemplated as are computer program products available as a download or on a computer readable medium. The computer program products are also available for installation on a network appliance or an individual computing device.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a table in accordance with the present invention showing terminology;

FIG. 4 is a table in accordance with the present invention showing the Count from FIG. 3 in array form;

FIG. 6 is a table in accordance with the present invention showing a representative resolution of a tie in the counts of three highest occurring tuples using Pythagorean's Theorem;

FIG. 7 is a table in accordance with the present invention showing an alternative resolution of a tie in the counts of highest occurring tuples;

FIGS. 8-60 are iterative data streams and tables in accordance with the present invention depicting dictionaries, arrays, tuple counts, encoding, and the like illustrative of multiple passes through the compression algorithm;

FIG. 62 is a table in accordance with the present invention showing compression statistics;

FIGS. 63-69 are diagrams and tables in accordance with the present invention relating to storage of a compressed file;

FIGS. 70-82*b* are data streams, tree diagrams and tables in accordance with the present invention relating to decompression of a compressed file.

DETAILED DESCRIPTION OF THE ILLUSTRATED EMBODIMENTS

Figure 2:
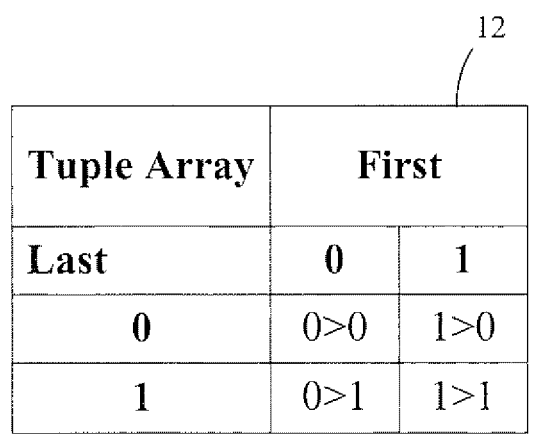
FIG. 2 a table in accordance with the present invention showing a tuple array and tuple nomenclature.

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for optimizing data compression of digital data.

In a representative embodiment, compression occurs by finding highly occurring patterns in data streams, and replacing them with newly defined symbols that require less space to store than the original patterns. The goal is to eliminate as much redundancy from the digital data as possible. The end result has been shown by the inventor to achieve greater compression ratios on certain tested files than algorithms heretofore known.

In information theory, it is well understood that collections of data contain significant amounts of redundant information. Some redundancies are easily recognized, while others are difficult to observe. A familiar example of redundancy in the English language is the ordered pair of letters QU. When Q appears in written text, the reader anticipates and expects the letter U to follow, such as in the words queen, quick, acquit, and square. The letter U is mostly redundant information when it follows Q. Replacing a recurring pattern of adjacent characters with a single symbol can reduce the amount of space that it takes to store that information. For example, the ordered pair of letters QU can be replaced with a single memorable symbol when the text is stored. For this example, the small Greek letter alpha ($\alpha$) is selected as the symbol, but any could be chosen that does not otherwise appear in the text under consideration. The resultant compressed text is one letter shorter for each occurrence of QU that is replaced with the single symbol ($\alpha$). e.g., "$\alpha$een," "$\alpha$ick," "ac$\alpha$it," and "s$\alpha$are." Such is also stored with a definition of the symbol alpha ($\alpha$) in order to enable the original data to be restored. Later, the compressed text can be expanded by replacing the symbol with the original letters QU. There is no information loss. Also, this process can be repeated many times over to achieve further compression.

DEFINITIONS

With reference to FIG. 1, a table 10 is used to define terminology used in the below compression method and procedure.

Discussion

Redundancy is the superfluous repetition of information. As demonstrated in the QU example above, adjacent characters in written text often form expected patterns that are easily detected. In contrast, digital data is stored as a series of bits where each bit can have only one of two values: off (represented as a zero (0)) and on (represented as a one (1)). Redundancies in digital data, such as long sequences of zeros or ones, are easily seen with the human eye. However, patterns are not obvious in highly complex digital data. The invention's methods and procedures identify these redundancies in stored information so that even highly complex data can be compressed. In turn, the techniques can be used to reduce, optimize, or eliminate redundancy by substituting the redundant information with symbols that take less space to store than the original information. When it is used to eliminate redundancy, the method might originally return compressed data that is larger than the original. This can occur because information about the symbols and how the symbols are encoded for storage must also be stored so that the data can be decompressed later. For example, compression of the word "queen" above resulted in the compressed word "αeen." But a dictionary having the relationship QU=α also needed to be stored with the word "αeen," which makes a "first pass" through the compression technique increase in size, not decrease. Eventually, however, further "passes" will stop increasing and decrease so rapidly, despite the presence of an ever-growing dictionary size, that compression ratios will be shown to greatly advance the state of the art. By automating the techniques with computer processors and computing software, compression will also occur exceptionally rapidly. In addition, the techniques herein will be shown to losslessly compress the data.

The Compression Procedure

The following compression method iteratively substitutes symbols for highly occurring tuples in a data stream. An example of this process is provided later in the document.

Prerequisites

The compression procedure will be performed on digital data. Each stored bit has a value of binary 0 or binary 1. This series of bits is referred to as the original digital data.

Preparing the Data

The original digital data is examined at the bit level. The series of bits is conceptually converted to a stream of characters, referred to as the data stream that represents the original data. The symbols 0 and 1 are used to represent the respective raw bit values in the new data stream. These symbols are considered to be atomic because all subsequently defined symbols represent tuples that are based on 0 and 1.

A dictionary is used to document the alphabet of symbols that are used in the data stream. Initially, the alphabet consists solely of the symbols 0 and 1.

Compressing the Data Stream

The following tasks are performed iteratively on the data stream:

Identifying all possible tuples that can occur for the set of characters that are in the current data stream.

Determining which of the possible tuples occurs most frequently in the current data stream. In the case of a tie, use the most complex tuple. (Complexity is discussed below.)

Creating a new symbol for the most highly occurring tuple, and add it to the dictionary.

Replacing all occurrences of the most highly occurring tuple with the new symbol.

Encoding the symbols in the data stream by using an encoding scheme, such as a path-weighted Huffman coding scheme.

Calculating the compressed file size.

Determining whether the compression goal has been achieved.

Repeating for as long as necessary to achieve optimal compression. That is, if a stream of data were compressed so completely that it was represented by a single bit, it and its complementary dictionary would be larger than the original representation of the stream of data absent the compression. (For example, in the QU example above, if "a" represented the entire word "queen," the word "queen" could be reduced to one symbol, e.g., "a." However, this one symbol and its dictionary (reciting "queen=α" is larger than the original content "queen.") Thus, optimal compression herein recognizes a point of marginal return whereby the dictionary grows too large relative to the amount of compression being achieved by the technique.

Each of these steps is described in more detail below.

Identifying all Possible Tuples

From FIG. 1, a "tuple" is an ordered pair of adjoining characters in a data stream. To identify all possible tuples in a given data stream, the characters in the current alphabet are systematically combined to form ordered pairs of symbols. The left symbol in the pair is referred to as the "first" character, while the right symbol is referred to as the "last" character. In a larger context, the tuples represent the "patterns" examined in a data stream that will yield further advantage in the art.

In the following example and with any data stream of digital data that can be compressed according to the techniques herein, two symbols (0 and 1) occur in the alphabet and are possibly the only symbols in the entire data stream. By examining them as "tuples," the combination of the 0 and 1 as ordered pairs of adjoining characters reveals only four possible outcomes, i.e., a tuple represented by "00," a tuple represented by "01," a tuple represented by "10," and a tuple represented by "11."

With reference to FIG. 2, these four possibilities are seen in table 12. In detail, the table shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the tuple is 0 followed by 1, or "0>1". In the cell for column 1 and row 0, the tuple is "1>0". In the cell for column 1 and row 1, the tuple is "1>1".

Determining the Most Highly Occurring Tuple

With FIG. 2 in mind, it is determined which tuple in a bit stream is the most highly occurring. To do this, simple counting occurs. It reveals how many times each of the possible tuples actually occurs. Each pair of adjoining characters is compared to the possible tuples and the count is recorded for the matched tuple.

The process begins by examining the adjacent characters in position one and two of the data stream. Together, the pair of characters forms a tuple. Advance by one character in the stream and examine the characters in positions two and three. By incrementing through the data stream one character at a time, every combination of two adjacent characters in the data stream is examined and tallied against one of the tuples.

Sequences of repeated symbols create a special case that must be considered when tallying tuples. That is, when a symbol is repeated three or more times, skilled artisans might identify instances of a tuple that cannot exist because the symbols in the tuple belong to other instances of the same tuple. The number of actual tuples in this case is the number of times the symbol repeats divided by two.

Figure 3:
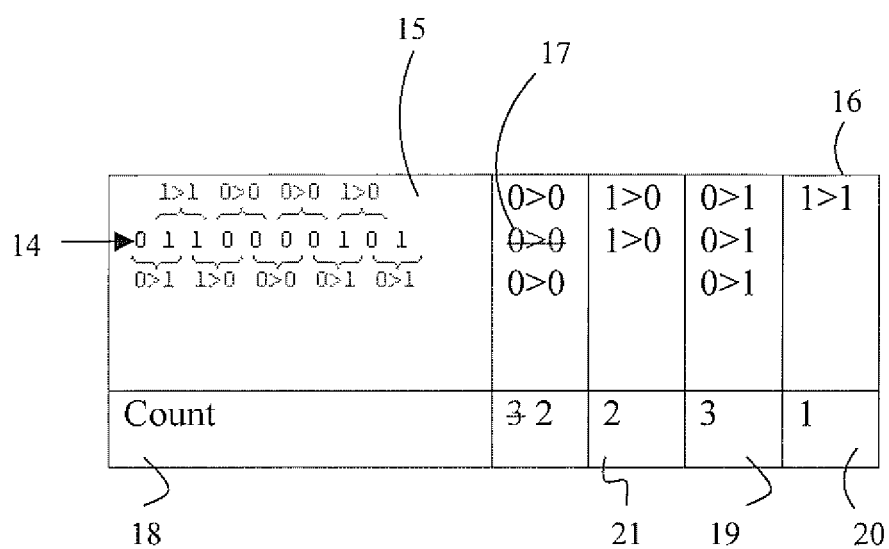
FIG. 3 is a table in accordance with the present invention showing the counting of tuples in a data stream.

For example, consider the data stream 14 in table 16 (FIG. 3) having 10 characters shown as "0110000101." Upon examining the first two characters 01, a tuple is recognized in the form 0 followed by 1 (0>1). Then, increment forward one character and consider the second and third characters 11, which forms the tuple of 1 followed by 1 (1>1.). As progression occurs through the data stream, 9 possible tuple combinations are found: 0>1, 1>1, 1>0, 0>0, 0>0, 0>0, 0>1, 1>0, and 0>1 (element 15, FIG. 3). In the sequence of four sequential zeros (at the fourth through seventh character positions in the data stream "011<u>0000</u>101"), three instances of a 0 followed by a 0 (or 0>0) are identified as possible tuples. It is observed that the second instance of the 0>0 tuple (element 17, FIG. 3) cannot be formed because the symbols are used in the 0>0 tuple before and after it, by prescribed rule. Thus, there are only two possible instances in the COUNT 18, FIG. 3, of the 0>0 tuple, not 3. In turn, the most highly occurring tuple counted in this data stream is 0>1, which occurs 3 times (element 19, FIG. 3). Similarly, tuple 1>1 occurs once (element 20, FIG. 3), while tuple 1>0 occurs twice (element 21, FIG. 3).

Figure 4:
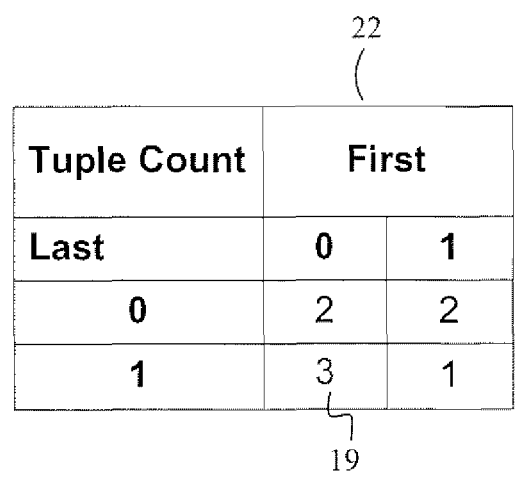

After the entire data stream has been examined, the final counts for each tuple are compared to determine which tuple occurs most frequently. In tabular form, the 0 followed by a 1 (tuple 0>1) occurs the most and is referenced at element 19 in table 22, FIG. 4.

In the situation of a tie between two or more tuples, skilled artisans must choose between one of the tuples. For this, experimentation has revealed that choosing the tuple that contains the most complex characters usually results in the most efficient compression. If all tuples are equally complex, skilled artisans can choose any one of the tied tuples and define it as the most highly occurring.

Figure 5:
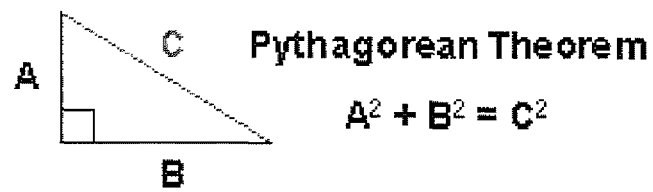
FIG. 5 is Pythagorean's Theorem for use in resolving ties in the counts of highest occurring tuples.

The complexity of a tuple is determined by imagining that the symbols form the sides of a right triangle, and the complexity is a measure of the length of the hypotenuse of that triangle. Of course, the hypotenuse is related to the sum of the squares of the sides, as defined by the Pythagorean Theorem, FIG. 5.

The tuple with the longest hypotenuse is considered the most complex tuple, and is the winner in the situation of a tie between the highest numbers of occurring tuples. The reason for this is that less-complex tuples in the situation of a tie are most likely to be resolved in subsequent passes in the decreasing order of their hypotenuse length. Should a tie in hypotenuse length occur, or a tie in complexity, evidence appears to suggest it does not make a difference which tuple is chosen as the most highly occurring.

For example, suppose that tuples 3>7, 4>4 and 1>5 each occur 356 times when counted (in a same pass). To determine the complexity of each tuple, use the tuple symbols as the two sides of a right triangle and calculate the hypotenuse, FIG. 6. In the instance of 3>7, the side of the hypotenuse is the square root of (three squared (9) plus seven squared (49)), or the square root of 58, or 7.6. In the instance of 4>4, the side of the hypotenuse is the square root of (four squared (16) plus four squared (16), of the square root of 32, or 5.7. Similar, 1>5 calculates as a hypotenuse of 5.1 as seen in table 23 in the Figure. Since the tuple with the largest hypotenuse is the most complex, 3>7's hypotenuse of 7.6 is considered more complex than either of the tuples 4>4 or 1>5.

Skilled artisans can also use the tuple array to visualize the hypotenuse by drawing lines in the columns and rows from the array origin to the tuple entry in the array, as shown in table 24 in FIG. 7. As seen, the longest hypotenuse is labeled 25, so the 3>7 tuple wins the tie, and is designated as the most highly occurring tuple. Hereafter, a new symbol is created to replace the highest occurring tuple (whether occurring the most outright by count or by tie resolution), as seen below. However, based on the complexity rule, it is highly likely that the next passes will replace tuple 4>4 and then tuple 1>5.

Creating a Symbol for the Most Highly Occurring Tuple

As before, a symbol stands for the two adjacent characters that form the tuple and skilled artisans select any new symbol they want provided it is not possibly found in the data stream elsewhere. Also, since the symbol and its definition are added to the alphabet, e.g., if "α=QU," a dictionary grows by one new symbol in each pass through the data, as will be seen. A good example of a new symbol for use in the invention is a numerical character, sequentially selected, because numbers provide an unlimited source of unique symbols. In addition, reaching an optimized compression goal might take thousands (or even tens of thousands) of passes through the data stream and redundant symbols must be avoided relative to previous passes and future passes.

Replacing the Tuple with the New Symbol

Upon examining the data stream to find all occurrences of the highest occurring tuple, skilled artisans simply substitute the newly defined or newly created symbol for each occurrence of that tuple. Intuitively, substituting a single symbol for two characters compresses the data stream by one character for each occurrence of the tuple that is replaced.

Encoding the Alphabet

To accomplish this, counting occurs for how many times that each of the symbols in the current alphabet occurs in the data stream. They then use the symbol count to apply an encoding scheme, such as a path-weighted Huffman coding scheme, to the alphabet. Huffman trees should be within the purview of the artisan's skill set.

The encoding assigns bits to each symbol in the current alphabet that actually appears in the data stream. That is, symbols with a count of zero occurrences are not encoded in the tree. Also, symbols might go "extinct" in the data stream as they are entirely consumed by yet more complex symbols, as will be seen. As a result, the Huffman code tree is rebuilt every time a new symbol is added to the dictionary. This means that the Huffman code for a given symbol can change with every pass. The encoded length of the data stream usually decreases with each pass.

Calculating the Compressed File Size

The compressed file size is the total amount of space that it takes to store the Huffman-encoded data stream plus the information about the compression, such as information about the file, the dictionary, and the Huffman encoding tree. The compression information must be saved along with other information so that the encoded data can be decompressed later.

To accomplish this, artisans count the number of times that each symbol appears in the data stream. They also count the number of bits in the symbol's Huffman code to find its bit length. They then multiply the bit length by the symbol count to calculate the total bits needed to store all occurrences of the symbol. This is then repeated for each symbol. Thereafter, the total bit counts for all symbols are added to determine how many bits are needed to store only the compressed data. To determine the compressed file size, add the total bit count for the data to the number of bits required for the related compression information (the dictionary and the symbol-encoding information).

Determining Whether the Compression Goal has been Achieved

Substituting a tuple with a single symbol reduces the total number of characters in a data stream by one for each instance of a tuple that is replaced by a symbol. That is, for each instance, two existing characters are replaced with one new character. In a given pass, each instance of the tuple is replaced by a new symbol. There are three observed results:

The length of the data stream (as measured by how many characters make up the text) decreases by half the number of tuples replaced.

The number of symbols in the alphabet increases by one.

The number of nodes in the Huffman tree increases by two.

By repeating the compression procedure a sufficient number of times, any series of characters can eventually be reduced to a single character. That "super-symbol" character conveys the entire meaning of the original text. However, the information about the symbols and encoding that is used to reach that final symbol is needed to restore the original data later. As the number of total characters in the text decreases with each repetition of the procedure, the number of symbols increases by one. With each new symbol, the size of the dictionary and the size of the Huffman tree increase, while the size of the data decreases relative to the number of instances of the tuple it replaces. It is possible that the information about the symbol takes more space to store than the original data it replaces. In order for the compressed file size to become smaller than the original data stream size, the text size must decrease faster than the size increases for the dictionary and the Huffman encoding information.

The question at hand is then, what is the optimal number of substitutions (new symbols) to make, and how should those substitutions be determined?

For each pass through the data stream, the encoded length of the text decreases, while the size of the dictionary and the Huffman tree increases. It has been observed that the compressed file size will reach a minimal value, and then increase. The increase occurs at some point because so few tuple replacements are done that the decrease in text size no longer outweighs the increase in size of the dictionary and Huffman tree.

The size of the compressed file does not decrease smoothly or steadily downward. As the compression process proceeds, the size might plateau or temporarily increase. In order to determine the true (global) minimum, it is necessary to continue some number of iterations past the each new (local) minimum point. This true minimal value represents the optimal compression for the data stream using this method.

Through experimentation, three conditions have been found that can be used to decide when to terminate the compression procedure: asymptotic reduction, observed low, and single character. Each method is described below. Other terminating conditions might be determined through further experimentation.

Asymptotic Reduction

An asymptotic reduction is a concession to processing efficiency, rather than a completion of the procedure. When compressing larger files (100 kilobytes (KB) or greater), after several thousand passes, each additional pass produces only a very small additional compression. The compressed size is still trending downward, but at such a slow rate that additional compute time is not warranted.

Based on experimental results, the process is terminated if at least 1000 passes have been done, and less than 1% of additional data stream compression has occurred in the last 1000 passes. The previously noted minimum is therefore used as the optimum compressed file.

Observed Low

A reasonable number of passes have been performed on the data and in the last reasonable number of passes a new minimum encoded file size has not been detected. It appears that further passes only result in a larger encoded file size.

Based on experimental results, the process is terminated if at least 1000 passes have been done, and in the last 10% of the passes, a new low has not been established. The previously noted minimum is then used as the optimum compressed file.

Single Character

The data stream has been reduced to exactly one character. This case occurs if the file is made up of data that can easily reduce to a single symbol, such a file filled with a repeating pattern. In cases like this, compression methods other than this one might result in smaller compressed file sizes.

How the Procedure Optimizes Compression

The representative embodiment of the invention uses Huffman trees to encode the data stream that has been progressively shortened by tuple replacement, and balanced against the growth of the resultant Huffman tree and dictionary representation.

The average length of a Huffman encoded symbol depends upon two factors:
   How many symbols must be represented in the Huffman tree
   The distribution of the frequency of symbol use The average encoded symbol length grows in a somewhat stepwise fashion as more symbols are added to the dictionary. Because the Huffman tree is a binary tree, increases naturally occur as the number of symbols passes each level of the power of 2 (2, 4, 8, 16, 32, 64, etc.). At these points, the average number of bits needed to represent any given symbol normally increases by 1 bit, even though the number of characters that need to be encoded decreases. Subsequent compression passes usually overcome this temporary jump in encoded data stream length.

The second factor that affects the efficiency of Huffman coding is the distribution of the frequency of symbol use. If one symbol is used significantly more than any other, it can be assigned a shorter encoding representation, which results in a shorter encoded length overall, and results in maximum compression. The more frequently a symbol occurs, the shorter the encoded stream that replaces it. The less frequently a symbol occurs, the longer the encoded stream that replaces it.

If all symbols occur at approximately equal frequencies, the number of symbols has the greater effect than does the size of the encoded data stream. Supporting evidence is that maximum compression occurs when minimum redundancy occurs, that is, when the data appears random. This state of randomness occurs when every symbol occurs at the same frequency as any other symbol, and there is no discernable ordering to the symbols.

The method and procedure described in this document attempt to create a state of randomness in the data stream. By replacing highly occurring tuples with new symbols, eventually the frequency of all symbols present in the data stream becomes roughly equal. Similarly, the frequency of all tuples is also approximately equal. These two criteria (equal occurrence of every symbol and equal occurrence of ordered symbol groupings) is the definition of random data. Random data means no redundancy. No redundancy means maximum compression.

This method and procedure derives optimal compression from a combination of the two factors. It reduces the number of characters in the data stream by creating new symbols to replace highly occurring tuples. The frequency distribution of symbol occurrence in the data stream tends to equalize as oft occurring symbols are eliminated during tuple replacement. This has the effect of flattening the Huffman tree, minimizing average path lengths, and therefore, minimizing encoded data stream length. The number of newly created symbols is held to a minimum by measuring the increase in dictionary size against the decrease in encoded data stream size.

Example of Compression

To demonstrate the compression procedure, a small data file contains the following simple ASCII characters:
   aaaaaaaaaaaaaaaaaaaaaaaaaaaabaaabaaaaaaaababbbbbb Each character is stored as a sequence of eight bits that correlates to the ASCII code assigned to the character. The bit values for each character are:
   a=01100001
   b=01100010

The digital data that represents the file is the original data that we use for our compression procedure. Later, we want to decompress the compressed file to get back to the original data without data loss.

Preparing the Data Stream

The digital data that represents the file is a series of bits, where each bit has a value of 0 or 1. We want to abstract the view of the bits by conceptually replacing them with symbols to form a sequential stream of characters, referred to as a data stream.

For our sample digital data, we create two new symbols called 0 and 1 to represent the raw bit values of 0 and 1, respectively. These two symbols form our initial alphabet, so we place them in the dictionary 26, FIG. 8.

Figure 9:
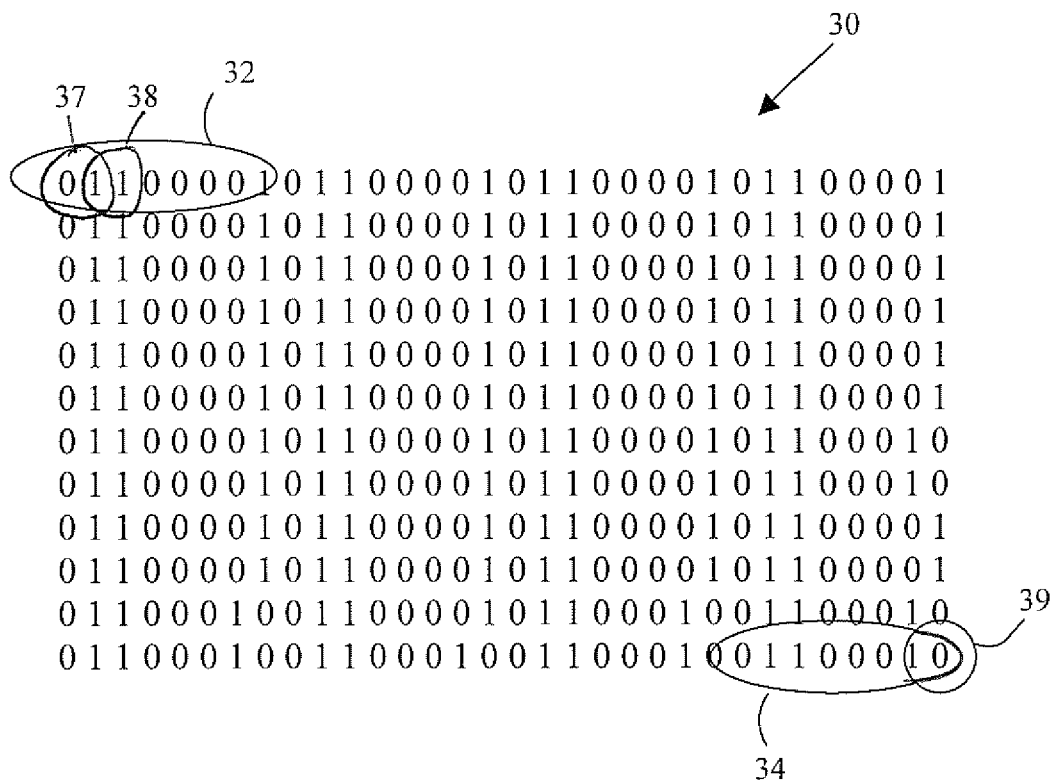

The data stream 30 in FIG. 9 represents the original series of bits in the stored file, e.g., the first eight bits 32 are "01100001" and correspond to the first letter "a" in the data file. Similarly, the very last eight bits 34 are "01100010" and correspond to the final letter "b" in the data file, and each of the 1's and 0's come from the ASCII code above.

Also, the characters in data stream 30 are separated with a space for user readability, but the space is not considered, just the characters. The space would not occur in computer memory either.

Compressing the Data Stream

The data stream 30 of FIG. 9 is now ready for compression. The procedure will be repeated until the compression goal is achieved. For this example, the compression goal is to minimize the amount of space that it takes to store the digital data.

Initial Pass

For the initial pass, the original data stream and alphabet that were created in "Preparing the Data Stream" are obtained.

Identifying all Possible Tuples

Figure 10:
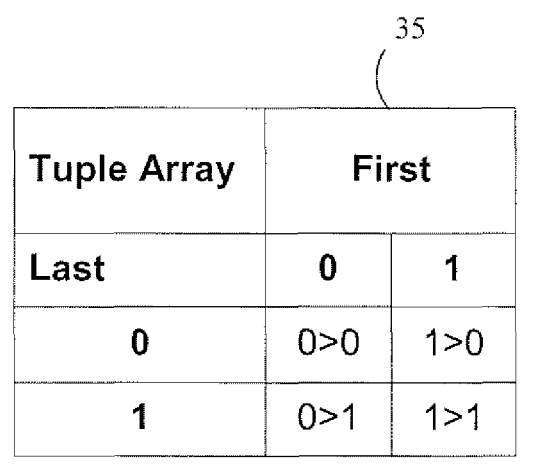

An easy way to identify all possible combinations of the characters in our current alphabet (at this time having 0 and 1) is to create a tuple array (table 35, FIG. 10). Those symbols are placed or fitted as a column and row, and the cells are filled in with the tuple that combines those symbols. The columns and rows are constructed alphabetically from left to right and top to bottom, respectively, according to the order that the symbols appear in our dictionary. For this demonstration, we will consider the symbol in a column to be the first character in the tuple, and the symbol in a row to be the last character in the tuple. To simplify the presentation of tuples in each cell, we will use the earlier-described notation of "first>last" to indicate the order of appearance in the pair of characters, and to make it easier to visually distinguish the symbols in the pair. The tuples shown in each cell now represent the patterns we want to look for in the data stream.

For example, the table 35 shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the topic is 0 followed by 1, or "0>1". In the cell for column 1 and row 0, the tuple is "1>0". In the cell for column 1 and row 1, the tuple is "1>1". (As skilled artisans will appreciate, most initial dictionaries and original tuple arrays will be identical to these. The reason is that computing data streams will all begin with a stream of 1's and 0's having two symbols only.)

Determining the Highly Occurring Tuple

After completion of the tuple array, we are ready to look for the tuples in the data stream 30, FIG. 9. We start at the beginning of the data stream with the first two characters "01" labeled element 37. We compare this pair of characters to our known tuples, keeping in mind that order matters. We match the pair to a tuple, and add one count for that instance. We move forward by one character, and look at the pair of characters 38 in positions two and three in the data stream, or "11." We compare and match this pair to one of the topics, and add one count for that instance. We continue tallying occurrences of the tuples in this manner until we reach the end of the data stream. In this instance, the final tuple is "10" labeled 39. By incrementing through the data stream one character at a time, we have considered every combination of two adjacent characters in the data stream, and tallied each instance against one of the tuples. We also consider the rule for sequences of repeated symbols, described above, to determine the actual number of instances for the tuple that is defined by pairs of that symbol.

Figure 11:
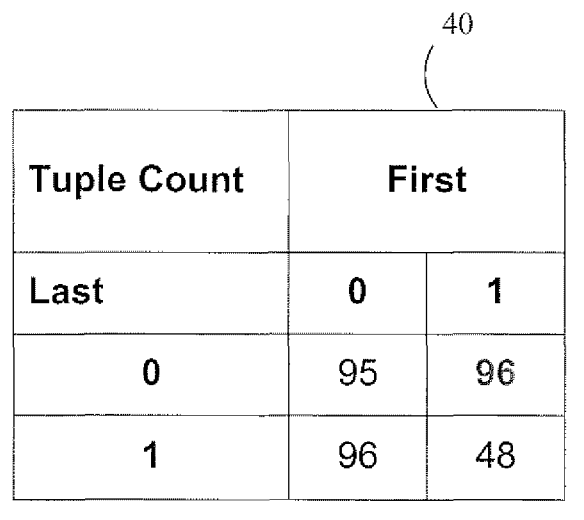

For example, the first two characters in our sample data stream are 0 followed by 1. This matches the tuple 0>1, so we count that as one instance of the tuple. We step forward one character. The characters in positions two and three are 1 followed by 1, which matches the tuple 1>1. We count it as one instance of the 1>1 tuple. We consider the sequences of three or more zeros in the data stream (e.g., 01100001 . . . ) to determine the actual number of tuples for the 0>0 tuple. We repeat this process to the end of the data set with the count results in table 40, FIG. 11.

Now that we have gathered statistics for how many times each tuple appears in the data stream 30, we compare the total counts for each tuple to determine which pattern is the most highly occurring. The tuple that occurs most frequently is a tie between a 1 followed by 0 (1>0), which occurs 96 times, and a 0 followed by 1 (0>1), which also occurs 96 times. As discussed above, skilled artisans then choose the most complex tuple and do so according to Pythagorean's Theorem. The sum of the squares for each tuple is the same, which is 1 (1+0) and 1 (0+1). Because they have the same complexity, it does not matter which one is chosen as the highest occurring. In this example, we will choose tuple 1>0.

Figure 12:
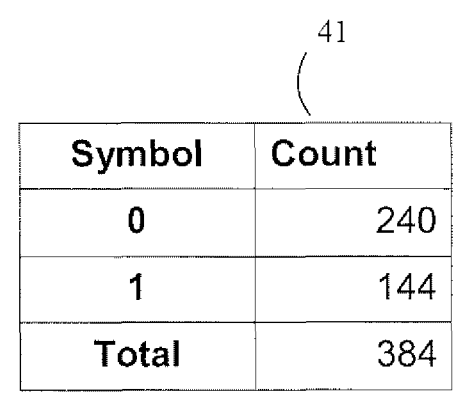

We also count the number of instances of each of the symbols in the current alphabet as seen in table 41, FIG. 12. The total symbol count in the data stream is 384 total symbols that represent 384 bits in the original data. Also, the symbol 0 appears 240 times in original data stream 30, FIG. 9, while the symbol 1 only appears 144 times.

Pass 1

In this next pass, we replace the most highly occurring tuple from the previous pass with a new symbol, and then we determine whether we have achieved our compression goal.

Creating a Symbol for the Highly Occurring Tuple

Figure 13:
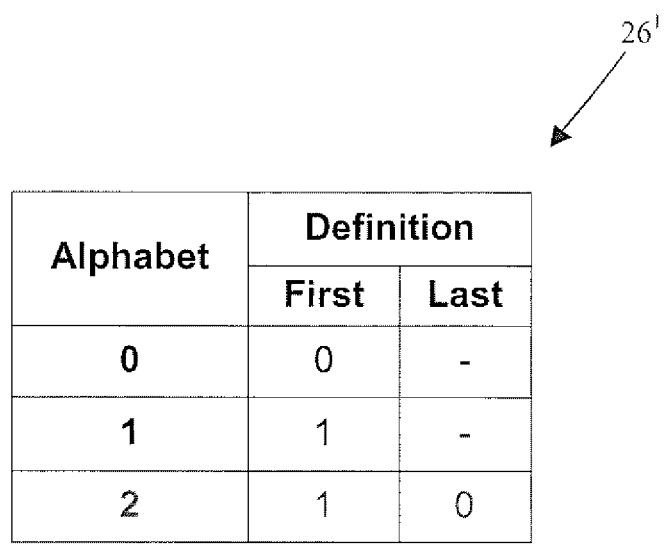

We replace the most highly occurring tuple from the previous pass with a new symbol and add it to the alphabet. Continuing the example, we add a new symbol 2 to the dictionary and define it with the tuple defined as 1 followed by 0 (1>0). It is added to the dictionary 26' as seen in FIG. 13. (Of course, original symbol 0 is still defined as a 0, while original symbol 1 is still defined as a 1. Neither of these represent a first symbol followed a last symbol which is why dashes appear in the dictionary 26' under "Last" for each of them.)

Replacing the Tuple with the New Symbol

Figure 8:
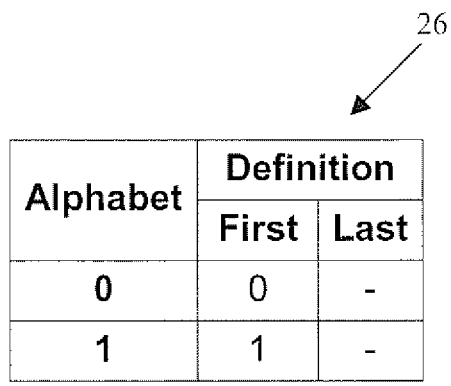
FIG. 8 is an initial dictionary in accordance with the present invention for the data stream of FIG. 9.
Figure 14:
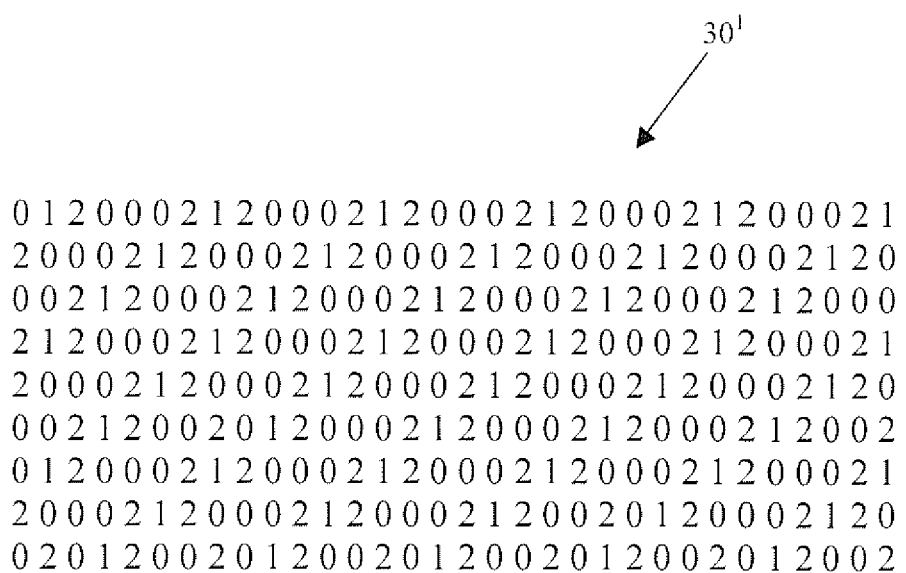

In the original data stream 30, every instance of the tuple 1>0 is now replaced with the new, single symbol. In our example data stream 30, FIG. 9, the 96 instances of the tuple 1>0 have been replaced with the new symbol "2" to create the output data stream 30'. FIG. 14, that we will use for this pass. As skilled artisans will observe, replacing ninety-six double instances of symbols with a single, new symbol shrinks or compresses the data stream 30' in comparison to the original data stream 30. FIG. 8.

Encoding the Alphabet

After we compress the data stream by using the new symbol, we use a path-weighted Huffman coding scheme to assign bits to each symbol in the current alphabet.

Figure 15:
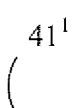

To do this, we again count the number of instances of each of the symbols in the current alphabet (now having "0," "1" and "2.") The total symbol count in the data stream is 288 symbols as seen in table 41', FIG. 15. We also have one end-of-file (EOF) symbol at the end of the data stream (not shown).

Next, we use the counts to build a Huffman binary code tree. 1) List the symbols from highest count to lowest count. 2) Combine the counts for the two least frequently occurring symbols in the dictionary. This creates a node that has the value of the sum of the two counts. 3) Continue combining the two lowest counts in this manner until there is only one symbol remaining. This generates a Huffman binary code tree.

Finally, label the code tree paths with zeros (0s) and ones (1s). The Huffman coding scheme assigns shorter code words to the more frequent symbols, which helps reduce the size length of the encoded data. The Huffman code for a symbol is defined as the string of values associated with each path transition from the root to the symbol terminal node.

Figure 16:
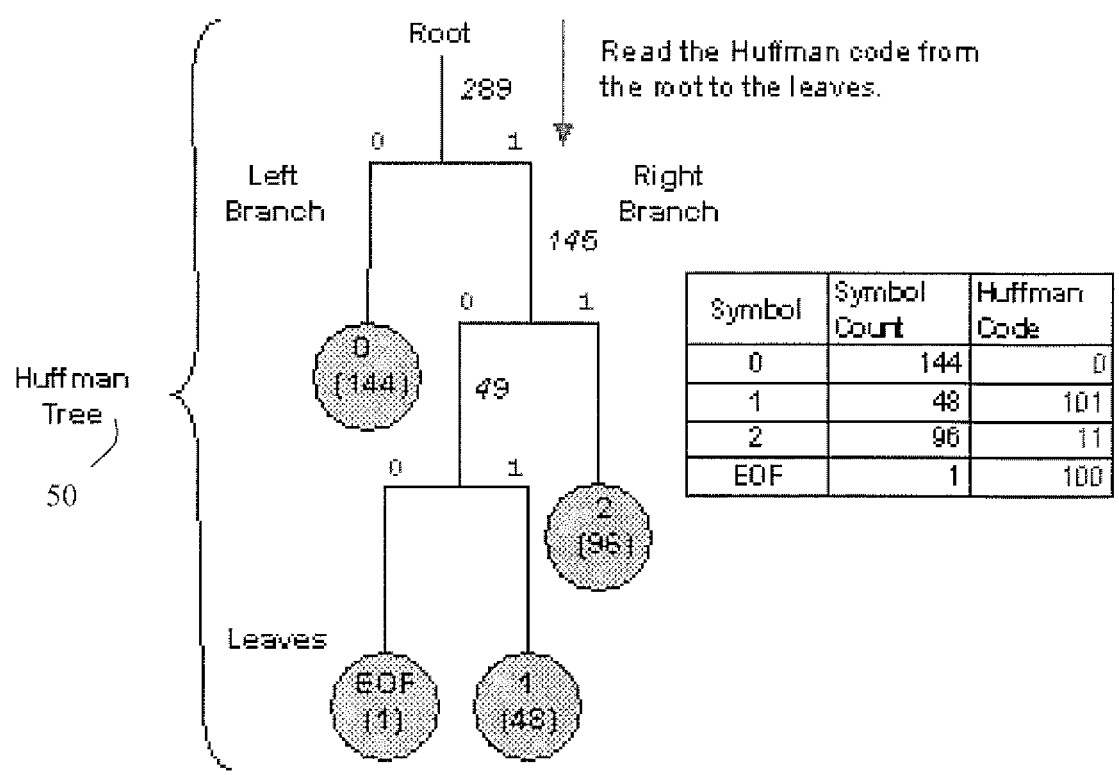

With reference to FIG. 16, the tree 50 demonstrates the process of building the Huffman tree and code for the symbols in the current alphabet. We also create a code for the end of file marker that we placed at the end of the data stream when we counted the tuples. In more detail, the root contemplates 289 total symbols, i.e., the 288 symbols for the alphabet "0," "1" and "2" plus one EOF symbol. At the leaves, the "0" is shown with its counts 144, the "1" with its count of 48, the "2" with its count of 96 and the EOF with its count of 1. Between the leaves and root, the branches define the count in a manner skilled artisans should readily understand.

In this compression procedure, we will re-build a Huffman code tree every time we add a symbol to the current dictionary. This means that the Huffman code for a given symbol can change with every compression pass.

Calculating the Compressed File Size

From the Huffman tree, we use its code to evaluate the amount of space needed to store the compressed data as seen in table 52, FIG. 17. First, we count the number of bits in the Huffman code for each symbol to find its bit length 53. Next, we multiply a symbol's bit length by its count 54 to calculate the total bits 55 used to store the occurrences of that symbol. We add the total bits 56 needed for all symbols to determine how many bits are needed to store only the compressed data. As seen, the current data stream 30', FIG. 14 requires 483 bits to store only the information.

Figure 18:
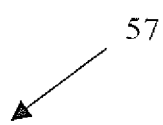

To know whether we achieved optimal compression, we must consider the total amount of space that it takes to store the compressed data plus the information about the compression that we need to store in order to decompress the data later. We also must store information about the file, the dictionary, and the Huffman tree. The table 57 in FIG. 18 shows the total compression overhead as being 25 bits, which brings the compressed size of the data stream to 508 bits, or 483 bits plus 25 bits.

Determining Whether the Compression Goal has been Achieved

Figure 19:

Finally, we compare the original number of bits (384, FIG. 12) to the current number of bits (508) that are needed for this compression pass. We find that it takes 1.32 times as many bits to store the compressed data as it took to store the original data, table 58, FIG. 19. This is not compression at all, but expansion.

In early passes, however, we expect to see that the substitution requires more space than the original data because of the effect of carrying a dictionary, adding symbols, and building a tree. On the other hand, skilled artisans should observe an eventual reduction in the amount of space needed as the compression process continues. Namely, as the size of the data set decreases by the symbol replacement method, the size grows for the symbol dictionary and the Huffman tree information that we need for decompressing the data.

Pass 2

In this pass, we replace the most highly occurring tuple from the previous pass (pass 1) with still another new symbol, and then we determine whether we have achieved our compression goal.

Identifying all Possible Tuples

As a result of the new symbol, the tuple array is expanded by adding the symbol that was created in the previous pass. Continuing our example, we add 2 as a first symbol and last symbol, and enter the tuples in the new cells of table 35'. FIG. 20.

Determining the Highly Occurring Tuple

As before, the tuple array identifies the tuples that we look for and tally in our revised alphabet. As seen in table 40'. FIG. 21, the Total Symbol Count=288. The tuple that occurs most frequently when counting the data stream 30'. FIG. 14, is the character 2 followed by the character 0 (2>0). It occurs 56 times as seen circled in table 40'. FIG. 21.

Creating a Symbol for the Highly Occurring Tuple

We define still another new symbol "3" to represent the most highly occurring tuple 2>0, and add it to the dictionary 26" FIG. 22, for the alphabet that was developed in the previous passes.

Replacing the Tuple with the New Symbol

Figure 23:
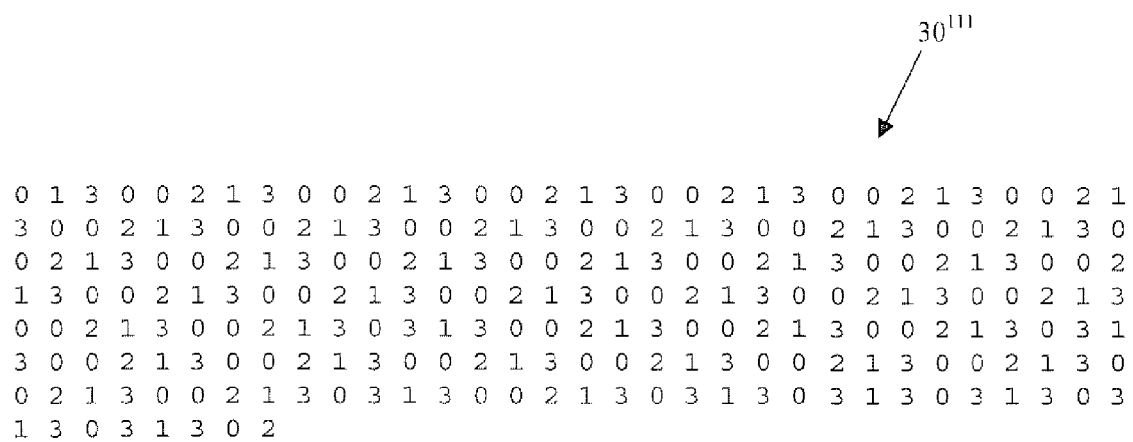

In the data stream 30', FIG. 14, we replace every instance of the most highly occurring tuple with the new single symbol. We replace the 56 instances of the 2>0 tuple with the symbol 3 and the resultant data stream 30" is seen in FIG. 23.

Encoding the Alphabet

Figure 24:
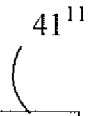

As demonstrated above, we count the number of symbols in the data stream, and use the count to build a Huffman tree and code for the current alphabet. The total symbol count has been reduced from 288 to 234 (e.g., 88+48+40+58, but not including the EOF marker) as seen in table 41", FIG. 24.

Calculating the Compressed File Size

Figure 25:
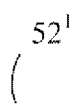

We need to evaluate whether our substitution reduces the amount of space that it takes to store the data. As described above, we calculate the total bits needed (507) as in table 52', FIG. 25.

Figure 26:
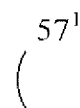

In table 57', FIG. 26, the compression overhead is calculated as 38 bits.

Determining Whether the Compression Goal has been Achieved

Finally, we compare the original number of bits (384) to the current number of bits (545=507+38) that are needed for this compression pass. We find that it takes 141% or 1.41 times as many bits to store the compressed data as it took to store the original data. Compression is still not achieved and the amount of data in this technique is growing larger rather than smaller in comparison to the previous pass requiring 132%.

Pass 3

In this pass, we replace the most highly occurring topic from the previous pass with a new symbol, and then we determine whether we have achieved our compression goal.

Identifying all Possible Tuples

We expand the tuple array 35". FIG. 28 by adding the symbol that was created in the previous pass. We add the symbol "3" as a first symbol and last symbol, and enter the tuples in the new cells.

Determining the Highly Occurring Tuple

Figure 29:
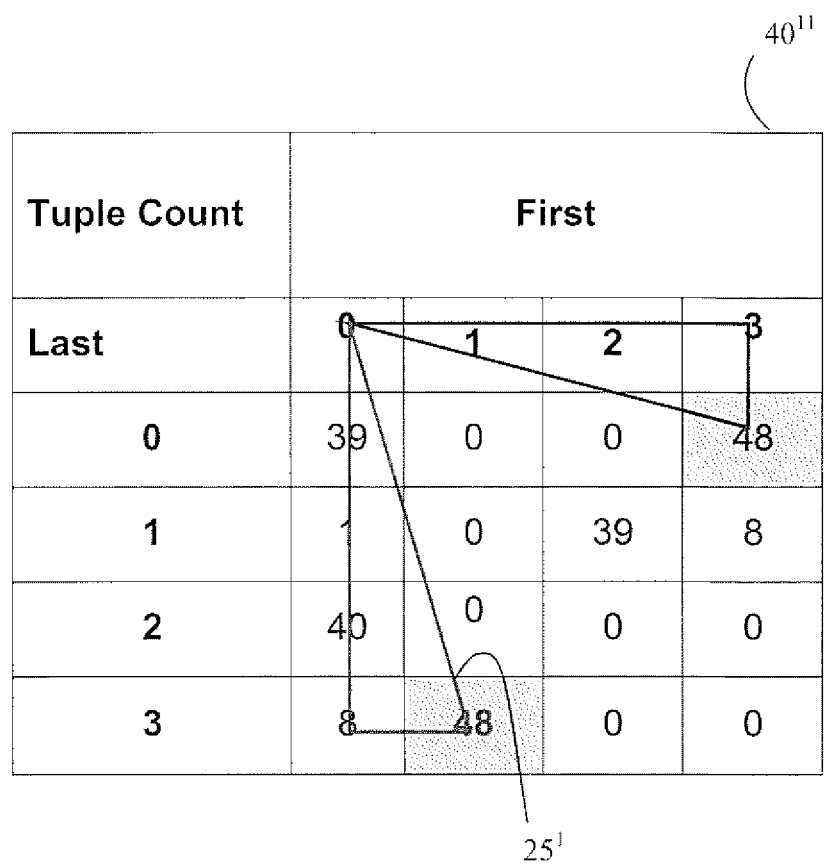

The tuple array identifies the tuples that we look for and tally in our revised alphabet. In table 40", FIG. 29, the Total Symbol Count is 232, and the tuple that occurs most frequently is the character 1 followed by character 3 (1>3). It occurs 48 times, which ties with the tuple of character 3 followed by character 0. We determine that the tuple 1>3 is the most complex tuple because it has a hypotenuse length 25' of 3.16 ($SQRT(1^2+3^2)$), and tuple 3>0 has a hypotenuse of 3 ($SQRT(0^2+3^2)$).

Creating a Symbol for the Highly Occurring Tuple

We define a new symbol 4 to represent the most highly occurring tuple 1>3, and add it to the dictionary 26". FIG. 30, for the alphabet that was developed in the previous passes.

Replacing the Tuple with the New Symbol

Figure 31:
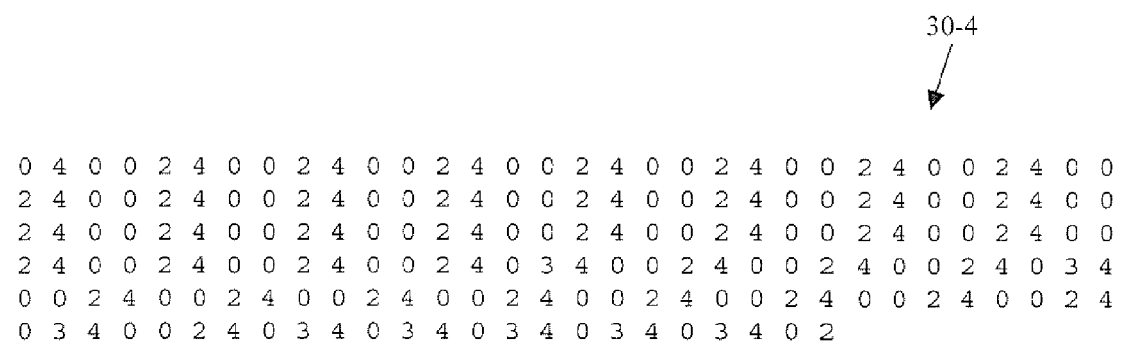

In the data stream, we replace every instance of the most highly occurring tuple from the earlier data stream with the new single symbol. We replace the 48 instances of the 1>3 tuple with the symbol 4 and new data stream 30-4 is obtained, FIG. 31.

Encoding the Alphabet

We count the number of symbols in the data stream, and use the count to build a Huffman tree and code for the current alphabet as seen in table 41''' FIG. 32. There is no Huffman code assigned to the symbol 1 because there are no instances of this symbol in the compressed data in this pass. (This can be seen in the data stream 30-4, FIG. 31.) The total symbol count has been reduced from 232 to 184 (e.g., 88+0+40+8+48, but not including the EOF marker).

Calculating the Compressed File Size

Figure 33:
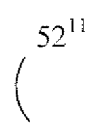

We need to evaluate whether our substitution reduces the amount of space that it takes to store the data. As seen in table 52", FIG. 33, the total bits are equal to 340.

Figure 34:
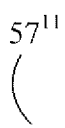

In table 57", FIG. 34, the compression overhead in bits is 42.

Determining Whether the Compression Goal has been Achieved

Finally, we compare the original number of bits (384) to the current number of bits (382) that are needed for this compression pass. We find that it takes 0.99 times as many bits to store the compressed data as it took to store the original data. Compression is achieved.

Pass 4

In this pass, we replace the most highly occurring tuple from the previous pass with a new symbol, and then we determine whether we have achieved our compression goal.

Identifying all Possible Tuples

We expand the tuple array 35'''. FIG. 36, by adding the symbol that was created in the previous pass. We add the symbol 4 as a first symbol and last symbol, and enter the tuples in the new cells.

Determining the Highly Occurring Tuple

Figure 37:
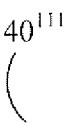

The tuple array identifies the tuples that we look for and tally in our revised alphabet. In table 40''', FIG. 37, the Total Symbol Count=184 and the tuple that occurs most frequently is the character 4 followed by character 0 (4>0). It occurs 48 times.

Creating a Symbol for the Highly Occurring Tuple

We define a new symbol 5 to represent the 4>0 tuple, and add it to the dictionary 26-4, FIG. 38, for the alphabet that was developed in the previous passes.

Replacing the Tuple with the New Symbol

Figure 39:
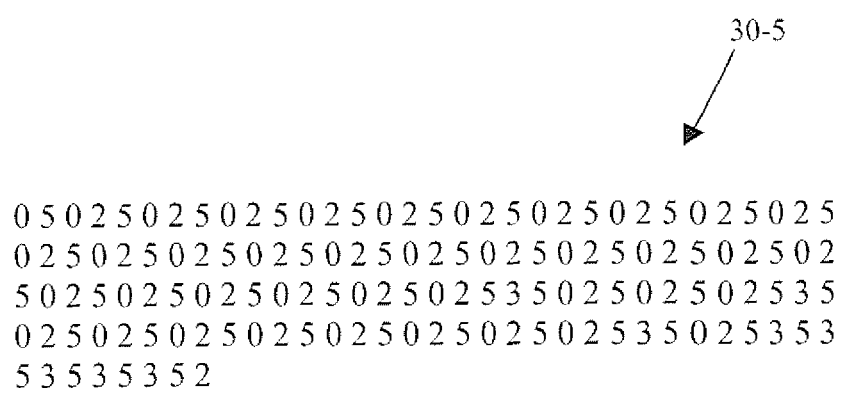

In the data stream, we replace every instance of the most highly occurring tuple with the new single symbol. We replace the 48 instances of the 40 tuple in data stream 30-4, FIG. 31, with the symbol 5 as seen in data stream 30-5, FIG. 39.

Encoding the Alphabet

As demonstrated above, we count the number of symbols in the data stream, and use the count to build a Huffman tree and code for the current alphabet. There is no Huffman code assigned to the symbol 1 and the symbol 4 because there are no instances of these symbols in the compressed data in this pass. The total symbol count has been reduced from 184 to 136 (e.g., 40+0+40+8+0+48, but not including the EOF marker) as seen in table 41-4, FIG. 40.

Calculating the Compressed File Size

We need to evaluate whether our substitution reduces the amount of space that it takes to store the data. As seen in table 52''' FIG. 41, the total number of bits is 283.

As seen in table 57'''. FIG. 42, the compression overhead in bits is 48.

Determining Whether the Compression Goal has been Achieved

Finally, we compare the original number of bits (384) to the current number of bits (331) that are needed for this compression pass as seen in table 58'''. FIG. 43. In turn, we find that it takes 0.86 times as many bits to store the compressed data as it took to store the original data.

Pass 5

In this pass, we replace the most highly occurring tuple from the previous pass with a new symbol, and then we determine whether we have achieved our compression goal.

Identifying all Possible Tuples

We expand the tuple array by adding the symbol that was created in the previous pass. We add the symbol 5 as a first symbol and last symbol, and enter the tuples in the new cells as seen in table 35-4, FIG. 44.

Determining the Highly Occurring Tuple

The tuple array identifies the tuples that we look for and tally in our revised alphabet as seen in table 40-4, FIG. 45. (Total Symbol Count=136) The tuple that occurs most frequently is the symbol 2 followed by symbol 5 (2>5), which has a hypotenuse of 5.4. It occurs 39 times. This tuple ties with the tuple 0>2 (hypotenuse is 2) and 5>0 (hypotenuse is 5). The tuple 2>5 is the most complex based on the hypotenuse length 25" described above.

Creating a Symbol for the Highly Occurring Tuple

We define a new symbol 6 to represent the most highly occurring tuple 2>5, and add it to the dictionary for the alphabet that was developed in the previous passes as seen in table 26-5, FIG. 46.

Replacing the Tuple with the New Symbol

In the data stream, we replace every instance of the most highly occurring tuple with the new single symbol. We replace the 39 instances of the 2>5 tuple in data stream 30-5, FIG. 39, with the symbol 6 as seen in data stream 30-6, FIG. 47.

Encoding the Alphabet

Figure 48:
Figure 49:
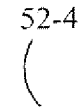

As demonstrated above, we count the number of symbols in the data stream, and use the count to build a Huffman tree and code for the current alphabet as seen in table 41-5, FIG. 48. There is no Huffman code assigned to the symbol 1 and the symbol 4 because there are no instances of these symbols in the compressed data in this pass. The total symbol count has been reduced from 136 to 97 (e.g., 40+1+8+9+39, but not including the EOF marker) as seen in table 52-4, FIG. 49.

Calculating the Compressed File Size

We need to evaluate whether our substitution reduces the amount of space that it takes to store the data. As seen in table 52-4, FIG. 49, the total number of bits is 187.

As seen in table 57-4, FIG. 50, the compression overhead in bits is 59.

Determining Whether the Compression Goal has been Achieved

Finally, we compare the original number of bits (384) to the current number of bits (246, or 187+59) that are needed for this compression pass as seen in table 58-4, FIG. 51. We find that it takes 0.64 times as many bits to store the compressed data as it took to store the original data.

Pass 6

In this pass, we replace the most highly occurring tuple from the previous pass with a new symbol, and then we determine whether we have achieved our compression goal.

Identifying all Possible Tuples

We expand the tuple array 35-5 by adding the symbol that was created in the previous pass as seen in FIG. 52. We add the symbol 6 as a first symbol and last symbol, and enter the tuples in the new cells.

Determining the Highly Occurring Tuple

The tuple array identifies the tuples that we look for and tally in our revised alphabet. (Total Symbol Count=97) The tuple that occurs most frequently is the symbol 0 followed by symbol 6 (0>6). It occurs 39 times as seen in table 40-5, FIG. 53.

Creating a Symbol the Highly Occurring Tuple

Figure 54:

We define a new symbol 7 to represent the 0>6 tuple, and add it to the dictionary for the alphabet that was developed in the previous passes as seen in table 26-6, FIG. 54.

Replacing the Tuple with the New Symbol

In the data stream, we replace every instance of the most highly occurring tuple with the new single symbol. We replace the 39 instances of the 0>6 tuple in data stream 30-6, FIG. 47, with the symbol 7 as seen in data stream 30-7, FIG. 55.

Encoding the Alphabet

As demonstrated above, we count the number of symbols in the data stream, and use the count to build a Huffman tree and code for the current alphabet as seen in table 41-6, FIG. 56. There is no Huffman code assigned to the symbol 1, symbol 4 and symbol 6 because there are no instances of these symbols in the compressed data in this pass. The total symbol count has been reduced from 97 to 58 (e.g., 1+0+1+8+0+9+0+39, but not including the EOF marker).

Figure 57:
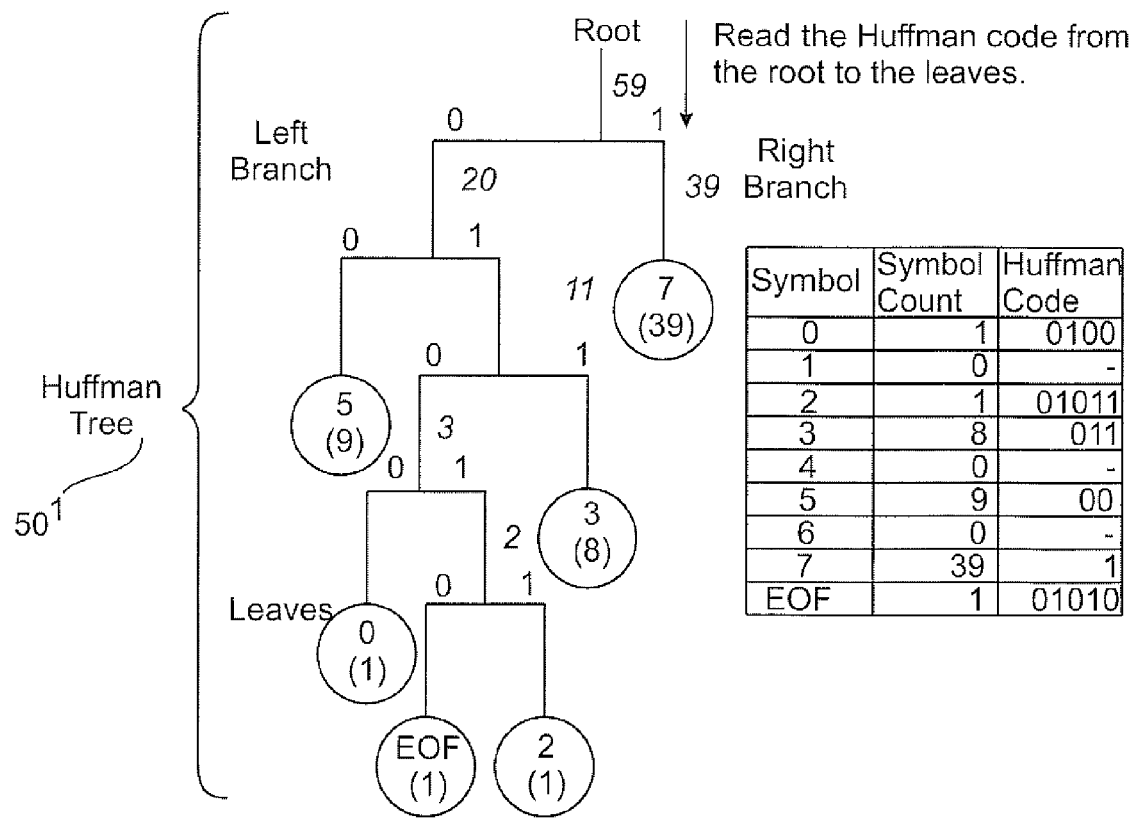

Because all the symbols 1, 4, and 6 have been removed from the data stream, there is no reason to express them in the encoding scheme of the Huffman tree 50'. FIG. 57. However, the extinct symbols will be needed in the decode table. A complex symbol may decode to two less complex symbols. For example, a symbol 7 decodes to 0>6.

We need to evaluate whether our substitution reduces the amount of space that it takes to store the data. As seen in table 52-5, FIG. 58, the total number of bits is 95.

As seen in table 57-5, FIG. 59, the compression overhead in bits is 71.

Determining Whether the Compression Goal has been Achieved

Figure 60:

Finally, we compare the original number of bits (384) to the current number of bits (166, or 95+71) that are needed for this compression pass as seen in table 58-5, FIG. 60. We find that it takes 0.43 times as many bits to store the compressed data as it took to store the original data.

Subsequent Passes

Figure 61:
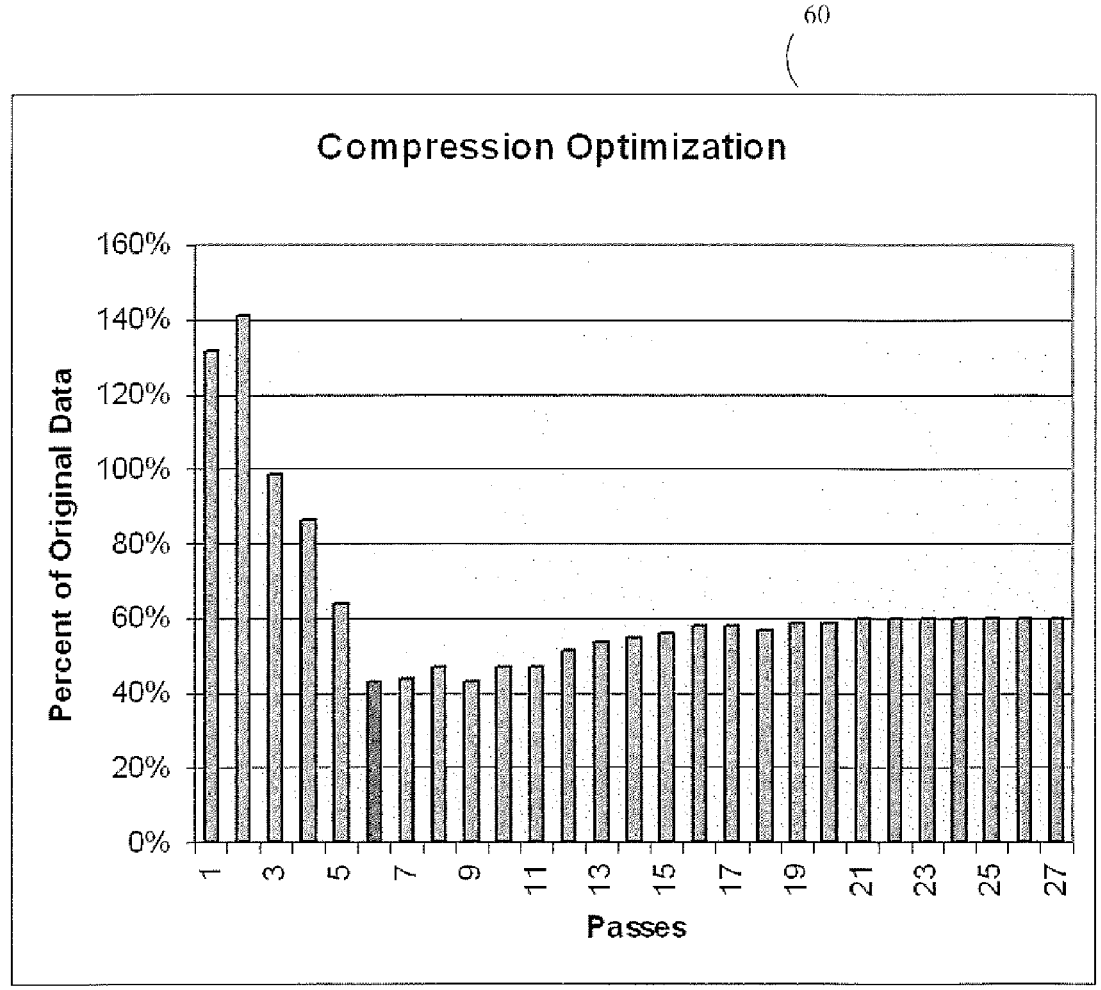
FIG. 61 is a chart in accordance with the present invention showing compression optimization.

Skilled artisans will also notice that overhead has been growing in size while the total number of bits is still decreasing. We repeat the procedure to determine if this is the optimum compressed file size. We compare the compression size for each subsequent pass to the first occurring lowest compressed file size. The chart 60, FIG. 61, demonstrates how the compressed file size grows, decreases, and then begins to grow as the encoding information and dictionary sizes grow. We can continue the compression of the foregoing techniques until the text file compresses to a single symbol after 27 passes.

Interesting Symbol Statistics

With reference to table 61, FIG. 62, interesting statistics about the symbols for this compression are observable. For instance, the top 8 symbols represent 384 bits (e.g., 312+45+24+2+1) and 99.9% (e.g., 81.2+11.7+6.2+0.5+0.3%) of the file.

Storing the Compressed File

The information needed to decompress a file is usually written at the front of a compressed file, as well as to a separate dictionary only file. The compressed file contains information about the file, a coded representation of the Huffman tree that was used to compress the data, the dictionary of symbols that was created during the compression process, and the compressed data. The goal is to store the information and data in as few bits as possible.

This section describes a method and procedure for storing information in the compressed file.

File Type

The first four bits in the file are reserved for the version number of the file format, called the file type. This field allows flexibility for future versions of the software that might be used to write the encoded data to the storage media. The file type indicates which version of the software was used when we saved the file in order to allow the file to be decompressed later.

Four bits allows for up to 16 versions of the software. That is, binary numbers from 0000 to 1111 represent version numbers from 0 to 15. Currently, this field contains binary 0000.

Maximum Symbol Width

The second four bits in the file are reserved for the maximum symbol width. This is the number of bits that it takes to store in binary form the largest symbol value. The actual value stored is four less than the number of bits required to store the largest symbol value in the compressed data. When we read the value, we add four to the stored number to get the actual maximum symbol width. This technique allows symbol values up to 20 bits. In practical terms, the value $2^{20}$ (2 raised to the $20^{11}$ power) means that about 1 million symbols can be used for encoding.

For example, if symbols 0-2000 might appear in the compressed file, the largest symbol ID (2000) would fit in a field containing 11 bits. Hence, a decimal 7 (binary 0111) would be stored in this field.

In the compression example, the maximum symbol width is the end-of-file symbol 8, which takes four bits in binary (1000). We subtract four, and store a value of 0000. When we decompress the data, we add four to zero to find the maximum symbol width of four bits. The symbol width is used to read the Huffman tree that immediately follows in the coded data stream.

Coded Huffman Tree

We must store the path information for each symbol that appears in the Huffman tree and its value. To do this, we convert the symbol's digital value to binary. Each symbol will be stored in the same number of bits, as determined by the symbol with the largest digital value and stored as the just read "symbol width".

In the example, the largest symbol in the dictionary in the Huffman encoded tree is the end-of-file symbol 8. The binary form of 8 is 1000, which takes 4 bits. We will store each of the symbol values in 4 bits.

To store a path, we will walk the Huffman tree in a method known as a pre-fix order recursive parse, where we visit each node of the tree in a known order. For each node in the tree one bit is stored. The value of the bit indicates if the node has children (1) or if it is a leaf with no children (0). If it is a leaf, we also store the symbol value. We start at the root and follow the left branch down first. We visit each node only once. When we return to the root, we follow the right branch down, and repeat the process for the right branch.

Figure 63:
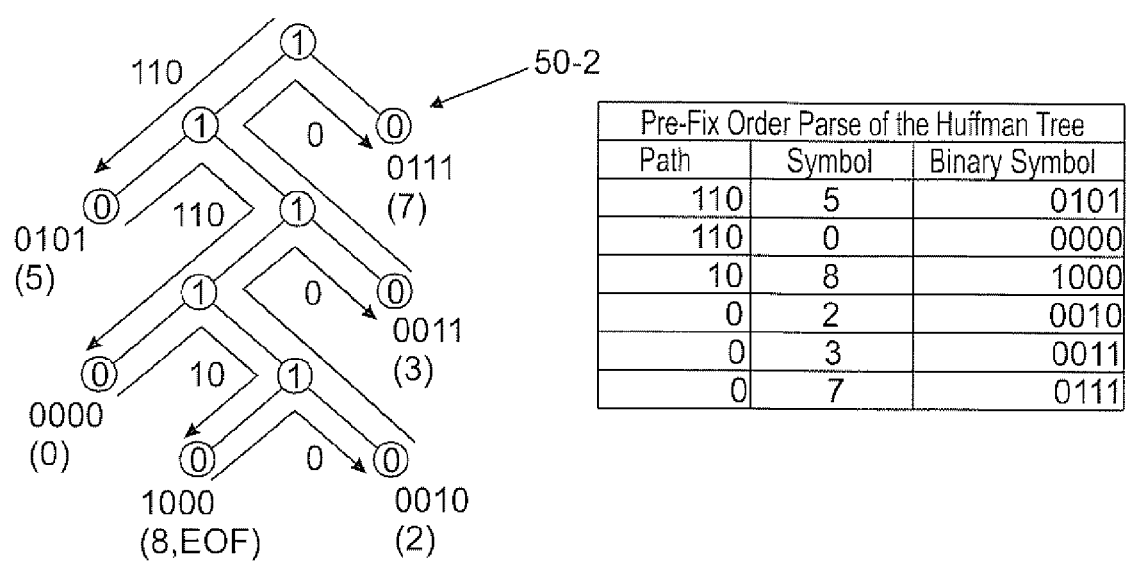

In the following example, the Huffman encoded tree is redrawn as 50-2 to illustrate the prefix-order parse, where nodes with children are labeled as 1, and leaf nodes are labeled as 0 as seen in FIG. 63.

The discovered paths and symbols are stored in the binary form in the order in which they are discovered in this method of parsing. Write the following bit string to the file, where the bits displayed in bold/underline represent the path, and the value of the 0 node are displayed without bold/underline. The spaces are added for readability; they are not written to media.
110 0101 110 0000 10 1000 0 0010 0 0011 0 0111

Encode Array for the Dictionary

The dictionary information is stored as sequential first/last definitions, starting with the two symbols that define the symbol 2. We can observe the following characteristics of the dictionary:

The symbols 0 and 1 are the atomic (non-divisible) symbols common to every compressed file, so they do not need to be written to media.

Because we know the symbols in the dictionary are sequential beginning with 2, we store only the symbol definition and not the symbol itself.

A symbol is defined by the tuple it replaces. The left and right symbols in the tuple are naturally symbols that precede the symbol they define in the dictionary.

We can store the left/right symbols of the tuple in binary form.

Figure 64:
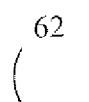

We can predict the maximum number of bits that it takes to store numbers in binary form. The number of bits used to store binary numbers increases by one bit with each additional power of two as seen, for example, in table 62, FIG. 64:

Because the symbol represents a tuple made up of lower-level symbols, we will increase the bit width at the next higher symbol value; that is, at 3, 5, 9, and 17, instead of at 2, 4, 8, and 16.

We use this information to minimize the amount of space needed to store the dictionary. We store the binary values for the tuple in the order of first and last, and use only the number of bits needed for the values.

Three dictionary instances have special meanings. The 0 and 1 symbols represent the atomic symbols of data binary 0 binary 1, respectively. The last structure in the array represents the end-of-file (EOF) symbol, which does not have any component pieces. The EOF symbol is always assigned a value that is one number higher than the last symbol found in the data stream.

Figure 65:

Continuing our compression example, the table 63, FIG. 65, shows how the dictionary is stored.

Write the following bit string to the file. The spaces are added for readability; they are not written to media.
10 1000 0111 100000 010101 000110

Encoded Data

To store the encoded data, we replace the symbol with its matching Huffman code and write the bits to the media. At the end of the encoded bit string, we write the EOF symbol. In our example, the final compressed symbol string is seen again as 30-7, FIG. 66, including the EOF.

The Huffman code for the optimal compression is shown in table 67, FIG. 67.

As we step through the data stream, we replace the symbol with the Huffman coded bits as seen at string 68, FIG. 68. For example, we replace symbol 0 with the bits 0100 from table 67, replace symbol 5 with 00 from table 67, replace instances of symbol 7 with 1, and so on. We write the following string to the media, and write the end of file code at the end. The bits are separated by spaces for readability; the spaces are not written to media.

The compressed bit string for the data, without spaces is:
0100001111111111111111111111111011001110110
0111111110110010110001100011000110001101101
010

Overview of the Stored File

Figure 69:
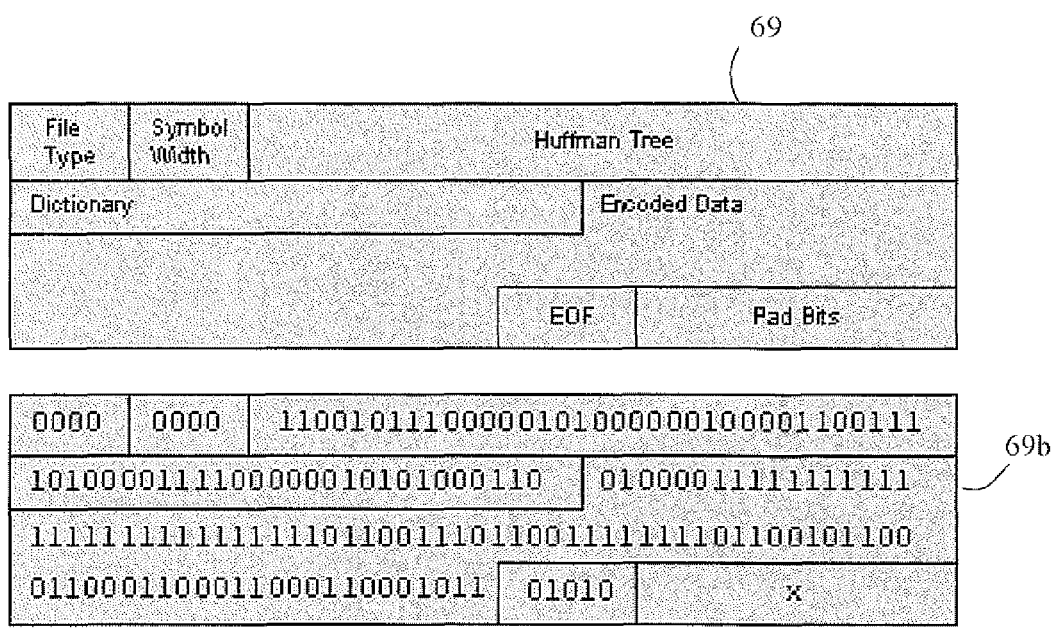

As summarized in the diagram 69, FIG. 69, the information stored in the compressed file is the file type, symbol width, Huffman tree, dictionary, encoded data, and EOF symbol. After the EOF symbol, a variable amount of pad bits are added to align the data with the final byte in storage.

Figure 70:

In the example, the bits 70 of FIG. 70 are written to media. Spaces are shown between the major fields for readability; the spaces are not written to media. The "x" represents the pad bits. In FIG. 69, the bits 70 are seen filled into diagram 69*b* corresponding to the compressed file format.

Decompressing the Compressed File

The process of decompression unpacks the data from the beginning of the file 69, FIG. 69, to the end of the stream.

File Type

Read the first four bits of the file to determine the file format version.

Maximum Symbol Width

Read the next four bits in the file, and then add four to the value to determine the maximum symbol width. This value is needed to read the Huffman tree information.

Huffman Tree

Reconstruct the Huffman tree. Each 1 bit represents a node with two children. Each 0 bit represents a leaf node, and it is immediately followed by the symbol value. Read the number of bits for the symbol using the maximum symbol width.

In the example, the stored string for Huffman is:
11001011100000101000000100001100111

Figure 71:
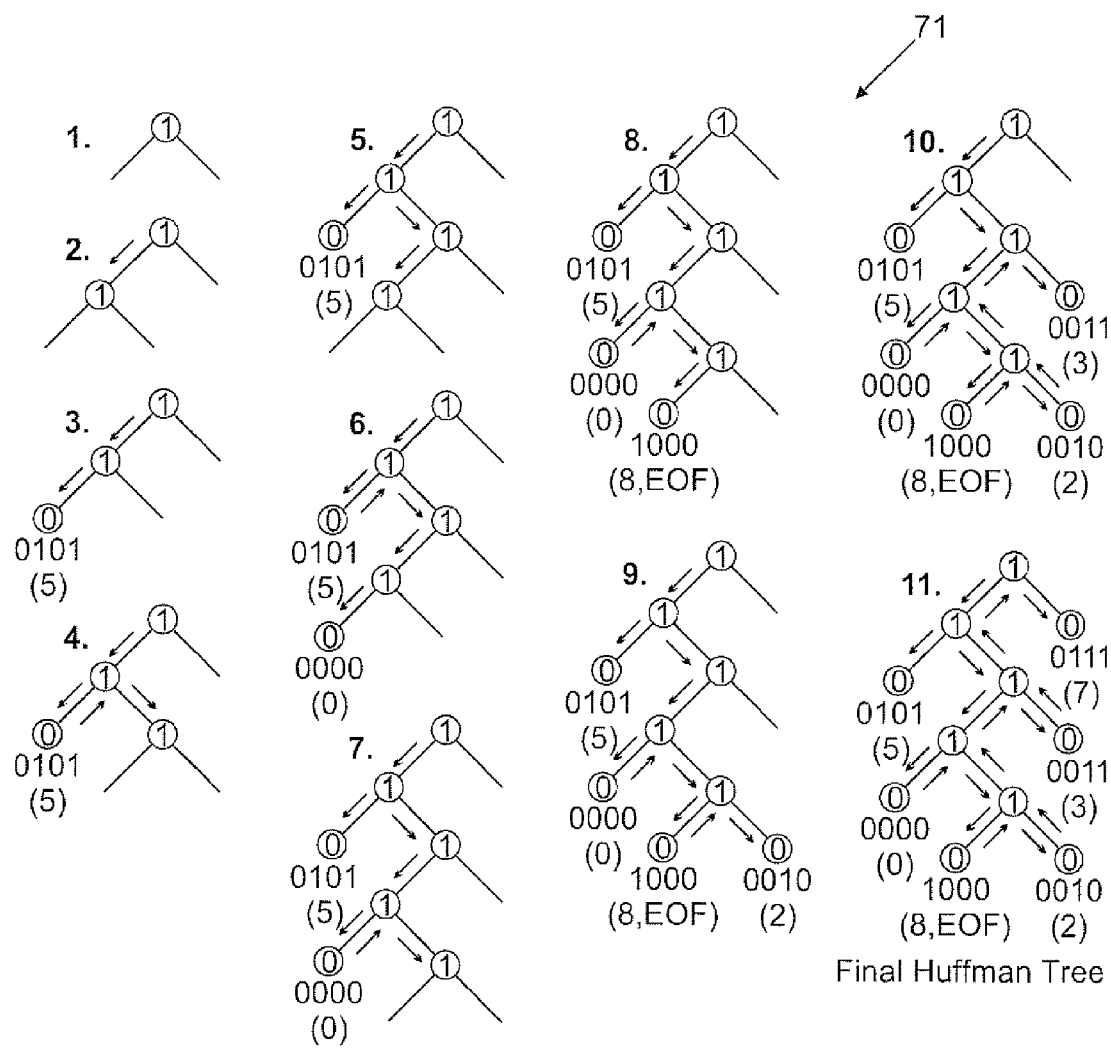

With reference to FIG. 71, diagram 71 illustrates how to unpack and construct the Huffman tree using the pre-fix order method.

Dictionary

Figure 72:
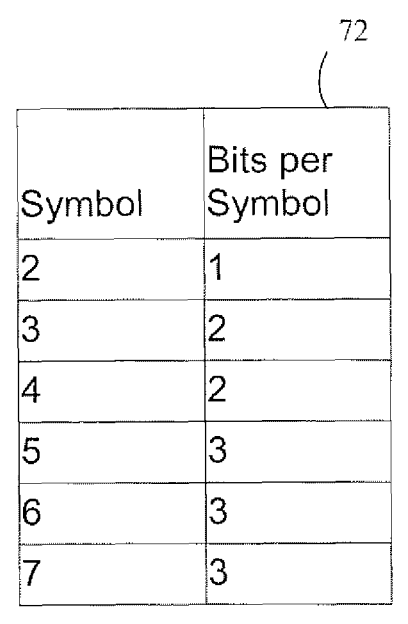

To reconstruct the dictionary from file 69, read the values for the pairs of tuples and populate the table. The values of 0 and 1 are known, so they are automatically included. The bits are read in groups based on the number of bits per symbol at that level as seen in table 72, FIG. 72.

In our example, the following bits were stored in the file:
1010000111101000010101000110

We read the numbers in pairs, according to the bits per symbol, where the pairs represent the numbers that define symbols in the dictionary:

| Bits | Symbol |
| --- | --- |
| 1 0 | 2 |
| 10 00 | 3 |
| 01 11 | 4 |
| 100 000 | 5 |
| 010 101 | 6 |
| 000 110 | 7 |

We convert each binary number to a decimal number:

| Decimal Value | Symbol |
| --- | --- |
| 1 0 | 2 |
| 2 0 | 3 |
| 1 3 | 4 |
| 4 0 | 5 |
| 2 5 | 6 |
| 0 6 | 7 |

We identify the decimal values as the tuple definitions for the symbols:

| Symbol | Tuple |
| --- | --- |
| 2 | 1 > 0 |
| 3 | 2 > 0 |
| 4 | 1 > 3 |
| 5 | 4 > 0 |
| 6 | 2 > 5 |
| 7 | 0 > 6 |

We populate the dictionary with these definitions as seen in table 73, FIG. 73.

Construct the Decode Tree

Figure 74:
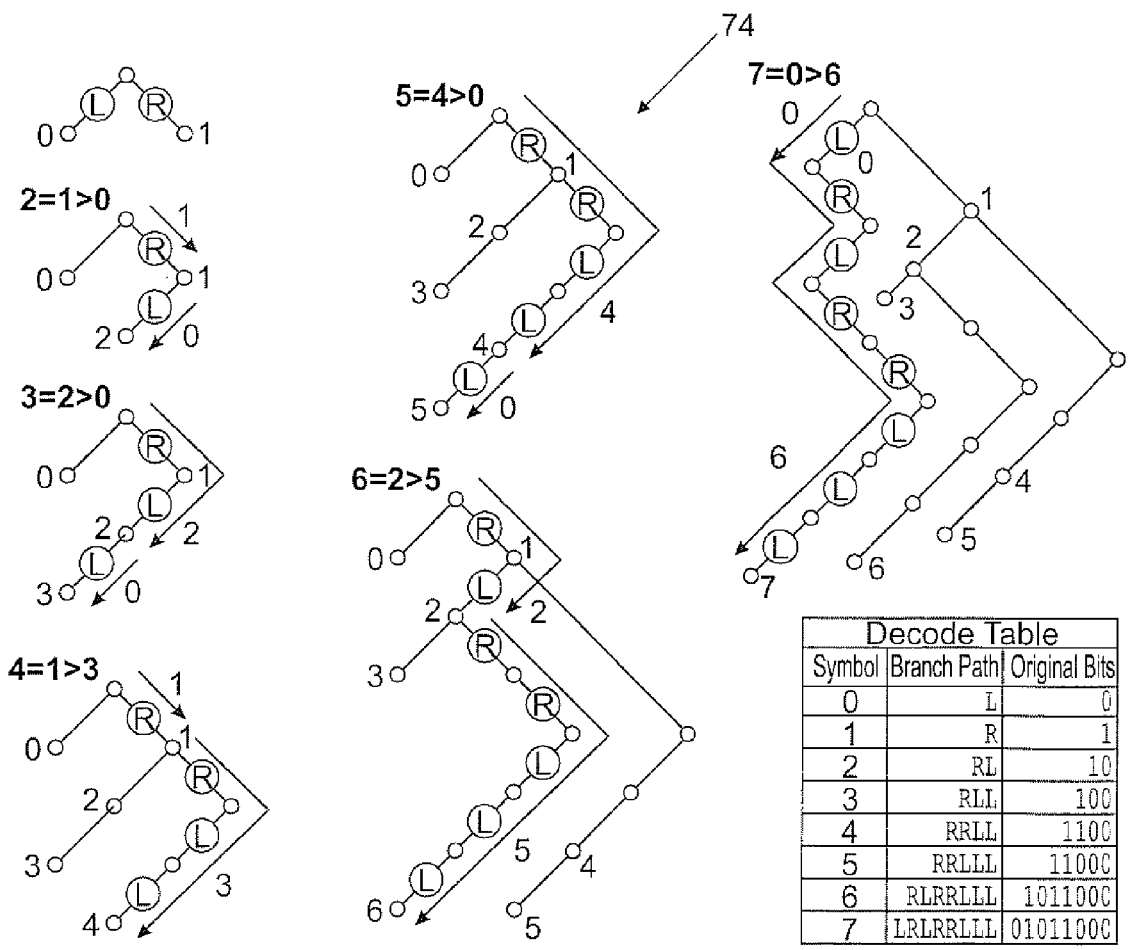

We use the tuples that are defined in the re-constructed dictionary to build the Huffman decode tree. Let's decode the example dictionary to demonstrate the process. The diagram 74 in FIG. 74 shows how we build the decode tree to determine the original bits represented by each of the symbols in the dictionary. The step-by-step reconstruction of the original bits is as follows:

Start with symbols 0 and 1. These are the atomic elements, so there is no related tuple. The symbol 0 is a left branch from the root. The symbol 1 is a right branch. (Left and right are relative to the node as you are facing the diagram—that is, on your left and on your right.) The atomic elements are each represented by a single bit, so the binary path and the original path are the same. Record the original bits 0 and 1 in the decode table.

Symbol 2 is defined as the tuple 1>0 (symbol 1 followed by symbol 0). In the decode tree, go to the node for symbol 1, then add a path that represents symbol 0. That is, add a left branch at node 1. The terminating node is the symbol 2. Traverse the path from the root to the leaf to read the branch paths of left (L) and right (R). Replace each left branch with a 0 and each right path with a 1 to view the binary forum of the path as LR, or binary 10.

Symbol 3 is defined as the tuple 2>0. In the decode tree, go to the node for symbol 2, then add a path that represents symbol 0. That is, add a left branch at node 2. The terminating node is the symbol 3. Traverse the path from the root to the leaf to read the branch path of RLL. Replace each left branch with a 0 and each right path with a 1 to view the binary form of the path as 100.

Symbol 4 is defined as the tuple 1>3. In the decode tree, go to the node for symbol 1, then add a path that represents symbol 3. From the root to the node for symbol 3, the path is RLL. At symbol 1, add the RLL path. The terminating node is symbol 4. Traverse the path from the root to the leaf to read the path of RRLL, which translates to the binary format of 1100.

Symbol 5 is defined as the tuple 4>0. In the decode tree, go to the node for symbol 4, then add a path that represents symbol 0. At symbol 4, add the L path. The terminating node is symbol 5. Traverse the path from the root to the leaf to read the path of RRLLL, which translates to the binary format of 11000.

Symbol 6 is defined as the tuple 2>5. In the decode tree, go to the node for symbol 2, then add a path that represents symbol 5. From the root to the node for symbol 5, the path is RRLLL. The terminating node is symbol 6. Traverse the path from the root to the leaf to read the path of RLRRLLL, which translates to the binary format of 1011000.

Symbol 7 is defined as the tuple 0>6. In the decode tree, go to the node for symbol 0, then add a path that represents symbol 6. From the root to the node for symbol 6, the path is RLRRLLL. The terminating node is symbol 7. Traverse the path from the root to the leaf to read the path of LRLRRLLL, which translates to the binary format of 01011000.

Decompress the Data

Figure 75:
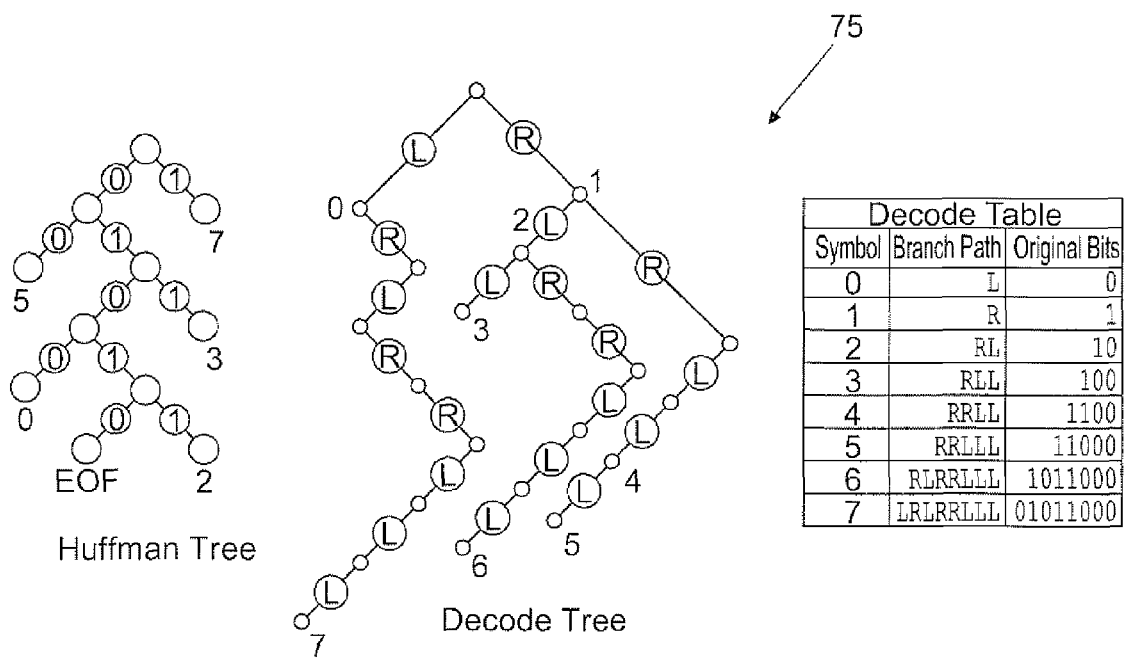

To decompress the data, we need the reconstructed Huffman tree and the decode table that maps the symbols to their original bits as seen at 75, FIG. 75. We read the bits in the data file one bit at a time, following the branching path in the Huffman tree from the root to a node that represents a symbol. The compressed file data bits are:

01000011111111111111111111111101100110110011111
1101100101100010001100011000110001011010110

Figure 76:
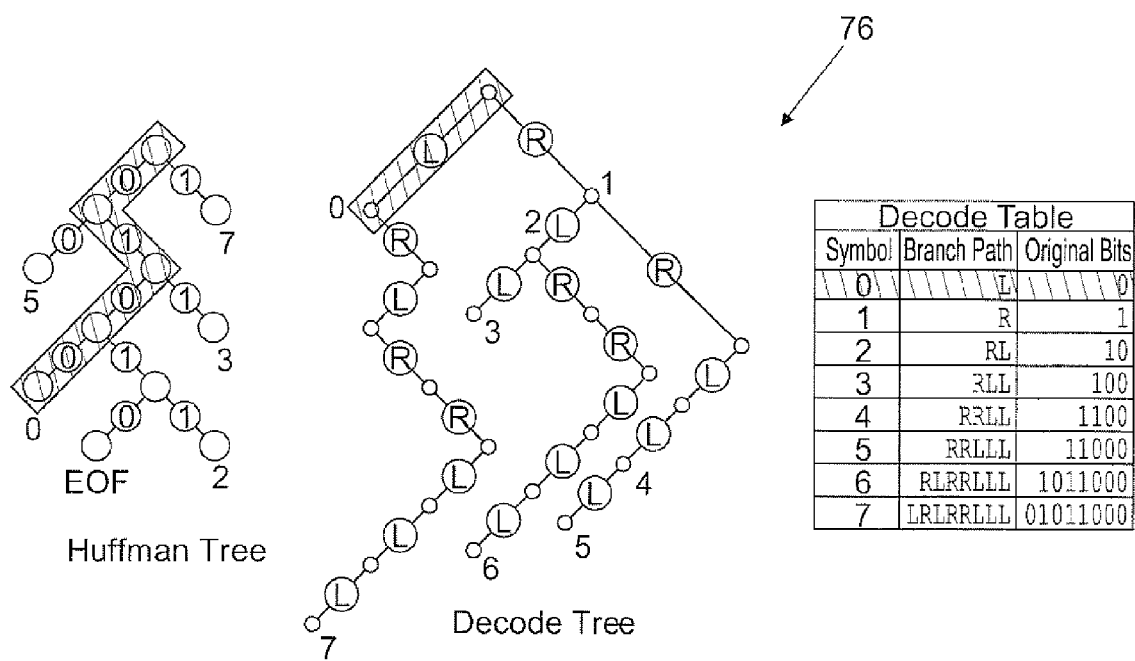

For example, the first four bits of encoded data 0100 takes us to symbol 0 in the Huffman tree, as illustrated in the diagram 76, FIG. 76. We look up 0 in the decode tree and table to find the original bits. In this case, the original bits are also 0. We replace 0100 with the single bit 0.

Figure 77:
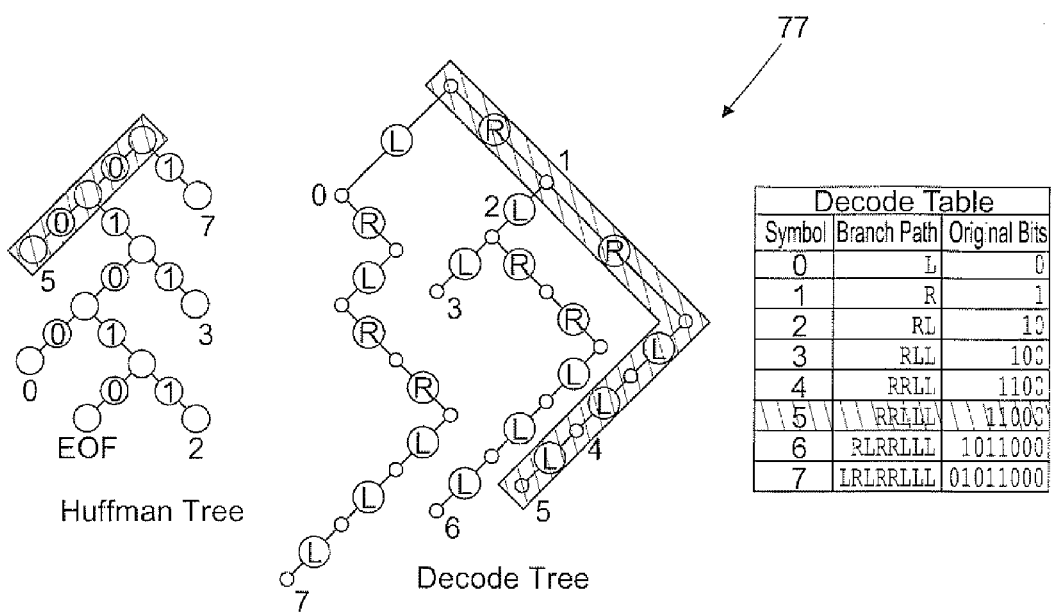

In the diagram 77 in FIG. 77, we follow the next two bits 00 to find symbol 5 in the Huffman tree. We look up 5 in the decode tree and table to find that symbol 5 represents original bits of 11000. We replace 00 with 11000.

Figure 78:
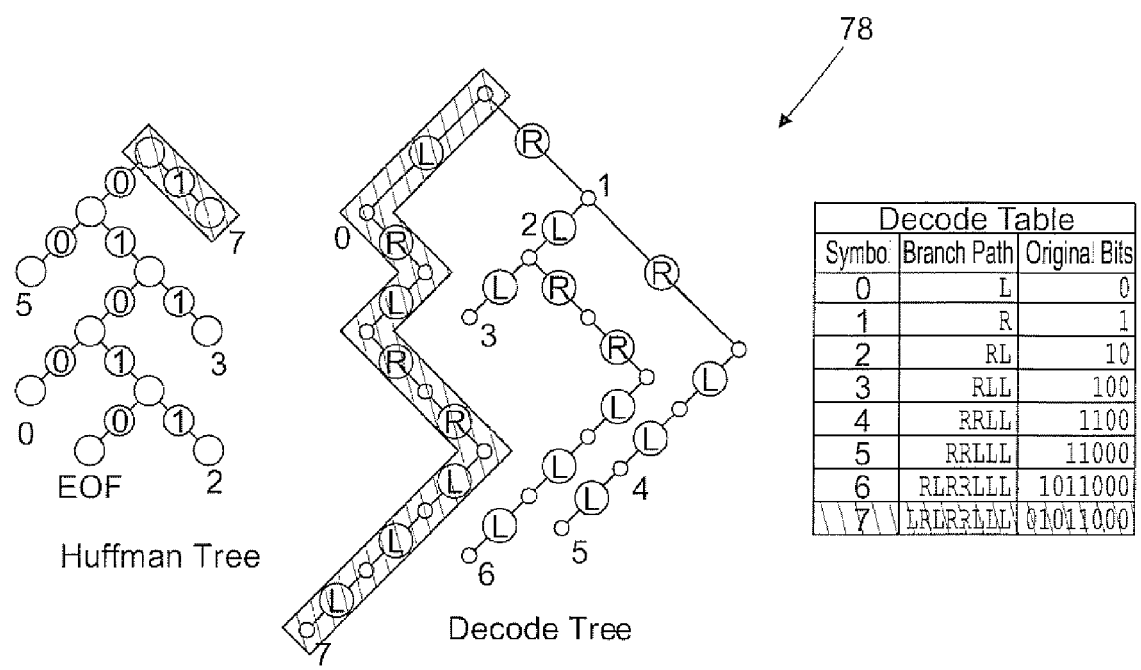

In the diagram 78, FIG. 78, we follow the next bit 1 to find symbol 7 in the Huffman tree. We look up 7 in the decode tree and table to find that symbol 7 represents the original bits 01011000. We replace the single bit 1 with 01011000. We repeat this for each 1 in the series of 1s that follow.

Figure 79:
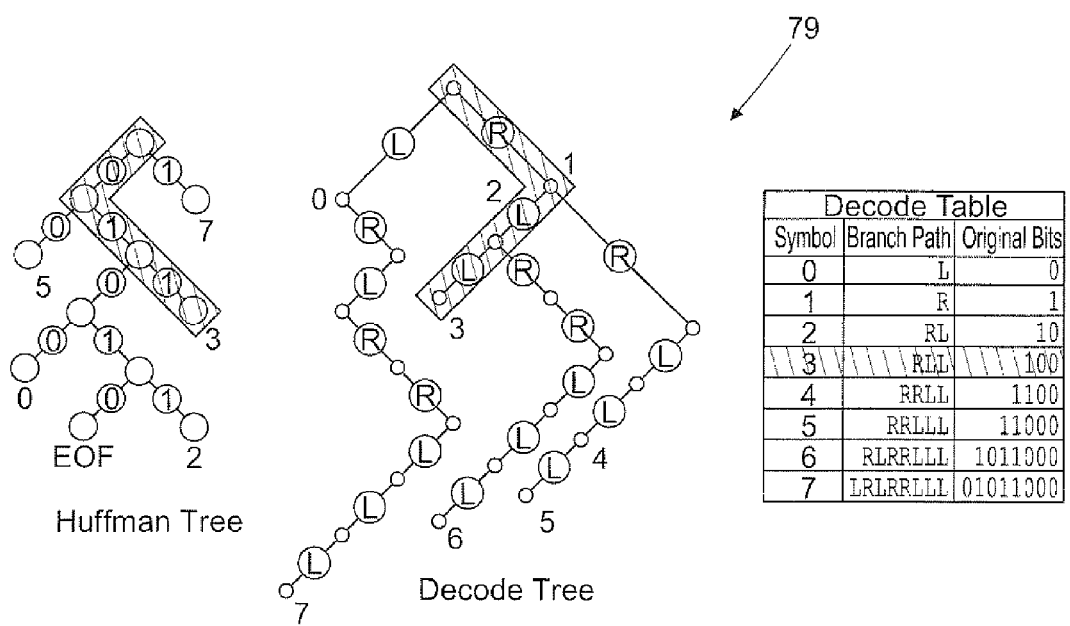

The next symbol we discover is with bits 011. We follow these bits in the Huffman tree in diagram 79, FIG. 79. We look up symbol 3 in the decode tree and table to find that it represents original bits 100, so we replace 011 with bits 100.

Figure 80:
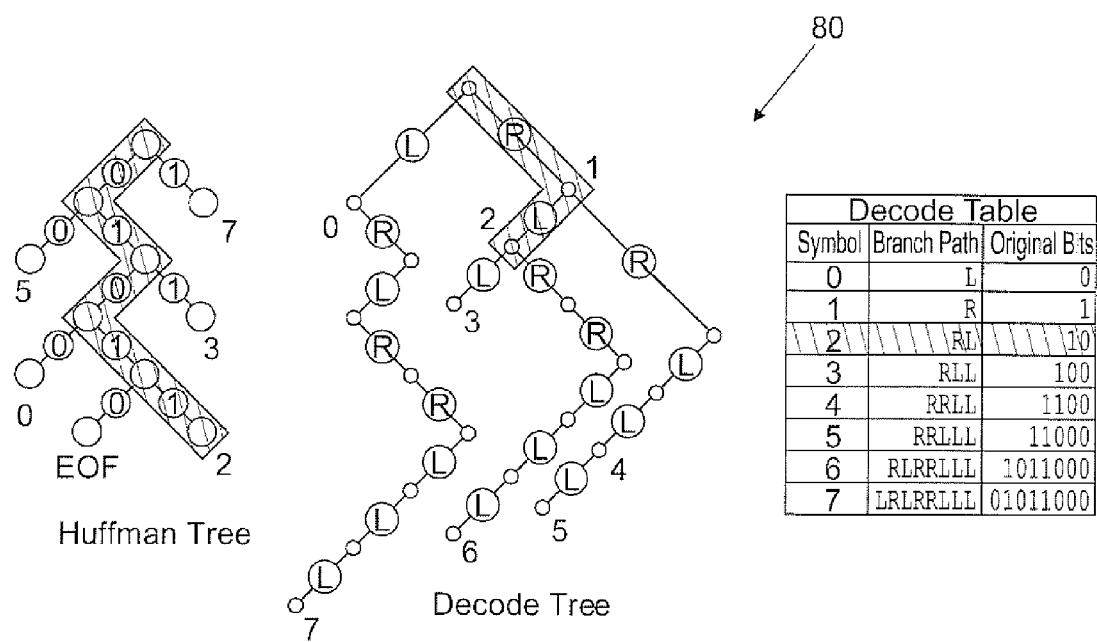

We continue the decoding and replacement process to discover the symbol 2 near the end of the stream with bits 01011, as illustrated in diagram 80, FIG. 80. We look up symbol 2 in the decode tree and table to find that it represents original bits 10, so we replace 01011 with bits 10.

Figure 81:
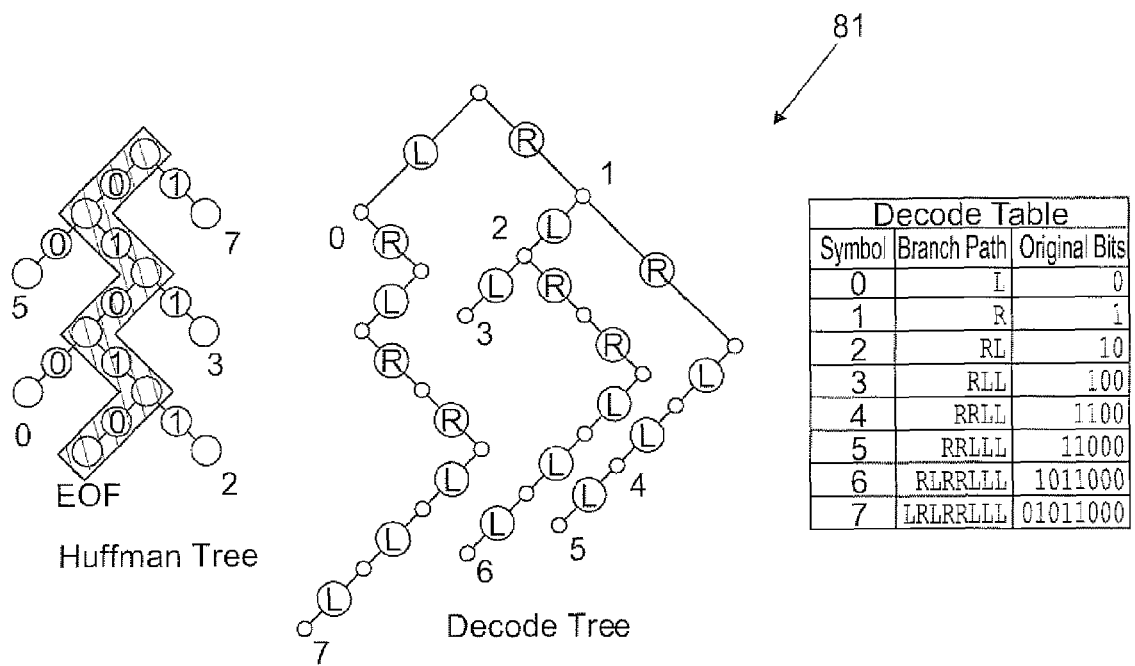

The final unique sequence of bits that we discover is the end-of-file sequence of 01010, as illustrated in diagram 81, FIG. 81. The EOF tells us that we are done unpacking.

Altogether, the unpacking of compressed bits recovers the original bits of the original data stream in the order of diagram 82 spread across two FIGS. 82*a* and 82*b*.

Figure 83:
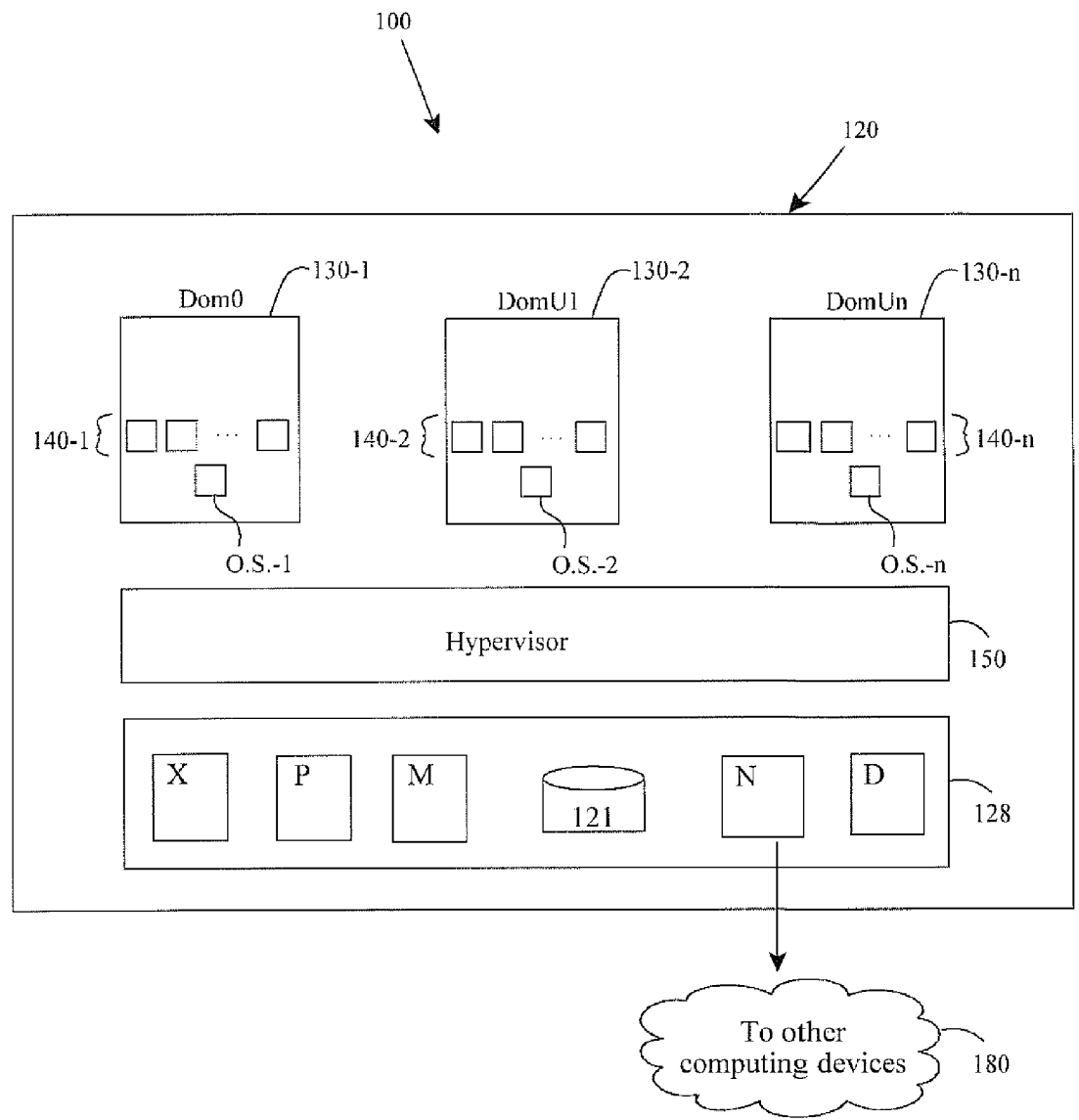
FIG. 83 is a diagram in accordance with the present invention showing a representative computing device for practicing all or some the foregoing.

With reference to FIG. 83, a representative computing system environment 100 includes a computing device 120. Representatively, the device is a general or special purpose computer, a phone, a PDA, a server, a laptop, etc., having a hardware platform 128. The hardware platform includes physical I/O and platform devices, memory (M), processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-n (domain Un), each having its own guest operating system (O.S.) (e.g., Linux, Windows, Netware, Unix, etc.), applications 140-1, 140-2, . . . 140-n, file systems, etc. The workloads of each virtual machine also consume data stored on one or more disks 121.

An intervening Xen or other hypervisor layer 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform. Alternatively, the computing system environment is not a virtual environment at all, but a more traditional environment lacking a hypervisor, and partitioned virtual domains. Also, the environment could include dedicated services or those hosted on other devices.

In any embodiment, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the interne, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of a computing device 120, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of utilizing a computing device for compressing original data arranged as a plurality of symbols, comprising:
   recursively and sequentially advancing through the plurality of symbols to determine a most frequently occurring tuple of the plurality of symbols, wherein a tuple comprises at least two symbols;
   recursively replacing, in the original data, the determined most frequently occurring tuple by a new symbol to generate a new compressed data stream;
   recursively comparing a size of a most recent new compressed data stream and attendant overhead to a size of an immediately preceding new compressed data stream and attendant overhead to determine if a compression goal for the original data has been achieved, wherein the attendant overhead indicates an amount of computing resources required to operate a corresponding compressing operation; and
   terminating the recursively determining, replacing, and comparing on determining that the compression goal has been achieved.

2. The method of claim 1, further including creating a dictionary for every symbol in the plurality of symbols.

3. The method of claim 2, further including encoding all of the plurality of symbols.

4. The method of claim 3, further including calculating a size for each of the encoded plurality of symbol.

5. The method of claim 2, further including calculating a size for the dictionary.

6. The method of claim 1, further including determining whether a compression goal has been achieved relative to a size of the original data.

7. The method of claim 1, wherein the determining the most frequently occurring tuple of the plurality of symbols further includes resolving ties between two or more tuples occurring a same number of times.

8. The method of claim 7, further including using the Pythagorean Theorem when resolving ties.

9. A method utilizing a computing device for compressing original data arranged as a plurality of symbols, comprising:
   recursively and sequentially advancing through the original data to determine all possible two-adjoining symbols of the plurality of symbols;
   recursively replacing in the original data a new symbol for a determined pair of most frequently occurring two-adjoining symbols of the plurality of symbols to generate a new compressed data stream;
   recursively comparing a size of a most recent new compressed data stream and attendant overhead to a size of an immediately preceding new compressed data stream and attendant overhead to determine if a compression goal for the original data has been achieved, wherein the attendant overhead indicates an amount of computing resources required to operate a corresponding compressing operation; and
   terminating the recursively determining, replacing, and comparing on determining that the compression goal has been achieved.

10. The method of claim 9, further including adding an entry for the new symbol to a dictionary already representing the plurality of symbols.

11. The method of claim 9, further including encoding the new compressed data stream and calculating a size of the new compressed data stream.

12. The method of claim 11, determining whether the size of the encoded new compressed data stream and associated attendant overhead is smaller or greater than a size of the original data.

13. The method of claim 12, if the size of the encoded new compressed data stream and the associated attendant overhead is not smaller than the size of the original data, repeating the replacing and the encoding until such time as the size of the new compressed data stream becomes smaller than the size of the original data.

14. In a computing system environment, a method utilizing a computing device for compressing original data arranged as a plurality of symbols, comprising:
  recursively advancing through the plurality of symbols sequentially to determine all possible tuples of the plurality of symbols, wherein a tuple comprises two or more symbols;
  recursively determining most frequently occurring tuple of the identified all possible tuples;
  recursively replacing in the original data a new symbol for the determined most frequently occurring tuple to generate a new compressed data stream;
  recursively encoding the new compressed data stream;
  recursively comparing a size of a most recent encoded new compressed data stream and attendant overhead to a size of an immediately preceding encoded new compressed data stream and attendant overhead to determine if a compression goal for the original data has been achieved; and
  terminating the recursively advancing, determining, replacing, encoding, and comparing on determining that the compression goal has been achieved.

15. The method of claim 14, further including creating a dictionary for every symbol in the new compressed data stream.

16. The method of claim 15, further including calculating a size for the encoded new compressed data stream and the dictionary.

17. The method of claim 16, further including comparing the calculated size of the new compressed data stream to a size of the original data to determine whether a pre-defined compression goal has been achieved.

18. The method of claim 14, wherein the determining the most frequently occurring tuple further includes resolving ties between two or more tuples occurring a same number of times.

19. The method of claim 15, further including decompressing the encoded new compressed data stream using the dictionary having every symbol in the new compressed data stream.

* * * * *